(12) United States Patent
Iwakura et al.

(10) Patent No.: US 11,144,729 B2
(45) Date of Patent: Oct. 12, 2021

(54) SUMMARY GENERATION METHOD AND SUMMARY GENERATION APPARATUS

(71) Applicant: FUJITSU LIMITED, Kawasaki (JP)

(72) Inventors: Tomoya Iwakura, Kawasaki (JP); Takuya Makino, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 16/694,934

(22) Filed: Nov. 25, 2019

(65) Prior Publication Data
US 2020/0175229 A1    Jun. 4, 2020

(30) Foreign Application Priority Data
Nov. 30, 2018 (JP) .............................. JP2018-225899

(51) Int. Cl.
| | | |
|---|---|---|
| *G06F 40/30* | (2020.01) | |
| *G06F 16/34* | (2019.01) | |
| *G06F 40/295* | (2020.01) | |
| *G06N 7/00* | (2006.01) | |
| *G06N 20/00* | (2019.01) | |

(52) U.S. Cl.
CPC ............ *G06F 40/30* (2020.01); *G06F 16/345* (2019.01); *G06F 40/295* (2020.01); *G06N 7/005* (2013.01); *G06N 20/00* (2019.01)

(58) Field of Classification Search
CPC ...... G06F 40/30; G06F 16/345; G06F 40/295; G06N 7/005; G06N 20/00
USPC ......................................................... 715/254
See application file for complete search history.

(56) References Cited

U.S. PATENT DOCUMENTS

| | | | | |
|---|---|---|---|---|
| 10,474,709 | B2 * | 11/2019 | Paulus ................... | G06F 16/345 |
| 2007/0118506 | A1 * | 5/2007 | Kao ....................... | G06F 16/345 |
| 2018/0260474 | A1 * | 9/2018 | Surdeanu .............. | G06F 16/951 |
| 2018/0308487 | A1 * | 10/2018 | Goel ....................... | G10L 15/26 |
| 2019/0122101 | A1 * | 4/2019 | Lei .......................... | G06F 17/16 |

OTHER PUBLICATIONS

Abigail See et al, "Get To The Point: Summarization with Pointer-Generator Networks", ACL, pp. 1073-1083, Aug. 2017 (11 pages) (Year: 2017).*

(Continued)

*Primary Examiner* — Stephen S Hong
*Assistant Examiner* — Broderick C Anderson
(74) *Attorney, Agent, or Firm* — Fujitsu Patent Center

(57) ABSTRACT

A computer-implemented summary generation method includes obtaining input text; generating an initial lattice including serially coupled nodes corresponding to words within the input text; generating a node corresponding to an expression within the initial lattice; adding the generated node to the initial lattice to provide an extended lattice corresponding to the input text; calculating a generation probability of each word within the input text using a dictionary and a machine learning model (model); calculating a generation probability for each node included in the extended lattice based on a hidden state output by a cell corresponding to the node among cells in an encoder of the model and a hidden state updated by a cell in a decoder of the model; and generating an element of a summary of the input text based on the generation probability of each word and the generation probability of each node of the extended lattice.

17 Claims, 26 Drawing Sheets

(56) References Cited

OTHER PUBLICATIONS

Zhao, Shan, et al. "Adversarial Training Based Lattice LSTM for Chinese Clinical Named Entity Recognition." Journal of Biomedical Informatics, vol. 99, 2019, p. 103290. Crossref, doi: 10.1016/j.jbi.2019.103290. (Year: 2019).*

Abigail See et al, "Get To The Point: Summarization with Pointer-Generator Networks", ACL, pp. 1073-1083, Aug. 2017(11 pages).

* cited by examiner

SUMMARY GENERATION METHOD AND SUMMARY GENERATION APPARATUS

CROSS-REFERENCE TO RELATED APPLICATION

This application is based upon and claims the benefit of priority of the prior Japanese Patent Application No. 2018-225899, filed on Nov. 30, 2018, the entire contents of which are incorporated herein by reference.

FIELD

The embodiments discussed herein are related to a summary generation method and summary generation apparatus.

BACKGROUND

Machine learning such as a neural network may be used for automatic summarization that generates a summary from a document on newspaper, a web site, an electric bulletin board or the like. For generation of a summary, a model is used that is constructed by coupling a recurrent neural networks (RNN) encoder that vectorizes input text and an RNN decoder that repeats generation of words of a summary with reference to the vectors of input text, for example.

Additionally, a mechanism has been proposed that outputs words in a summary based on the generation probabilities of words included in input text in addition to the generation probabilities of words output by an RNN decoder by combining the RNN and pointer generator networks (pointer-Gen).

Related techniques are disclosed in, for example, Abigail See et al., "Get To The Point: Summarization with Pointer-Generator Networks", Association for Computational Linguistics, pp. 1073-1084, 2017.

SUMMARY

According to an aspect of the embodiments, a computer-implemented summary generation method includes obtaining input text; generating an initial lattice including a plurality of serially coupled nodes corresponding to words within the input text; generating a node of a section corresponding to a predetermined expression within the initial lattice; adding the generated node to the initial lattice to provide an extended lattice corresponding to the input text; calculating a generation probability of each word within the input text using a dictionary and a machine learning model; calculating a generation probability for each node included in the extended lattice based on a hidden state output by a cell corresponding to the node among cells in an encoder of the machine learning model and a hidden state updated by a cell in a decoder of the machine learning model; and generating an element of a summary of the input text based on the generation probability of each word and the generation probability of each node of the extended lattice.

BRIEF DESCRIPTION OF DRAWINGS

FIG. 3A is a diagram illustrating an example of learning input text;

FIG. 3B is a diagram illustrating an example of a correct answer summary;

FIG. 19A is a diagram illustrating an example of learning input text;

FIG. 19B is a diagram illustrating an example of a correct answer summary;

DESCRIPTION OF EMBODIMENTS

However, according to the technology, a copy of words included in input text is output as words of a summary. As a result, omission of a phrase included in the input text may be failed.

With reference to the attached drawings, a summary generation method, a summary generation program and a summary generating apparatus according to the subject application will be described below. It is not intended that the technology disclosed here is limited by embodiments. It is possible to combine embodiments appropriately as long as the processing details do not conflict.

Embodiment 1

System Configuration

Figure 1:
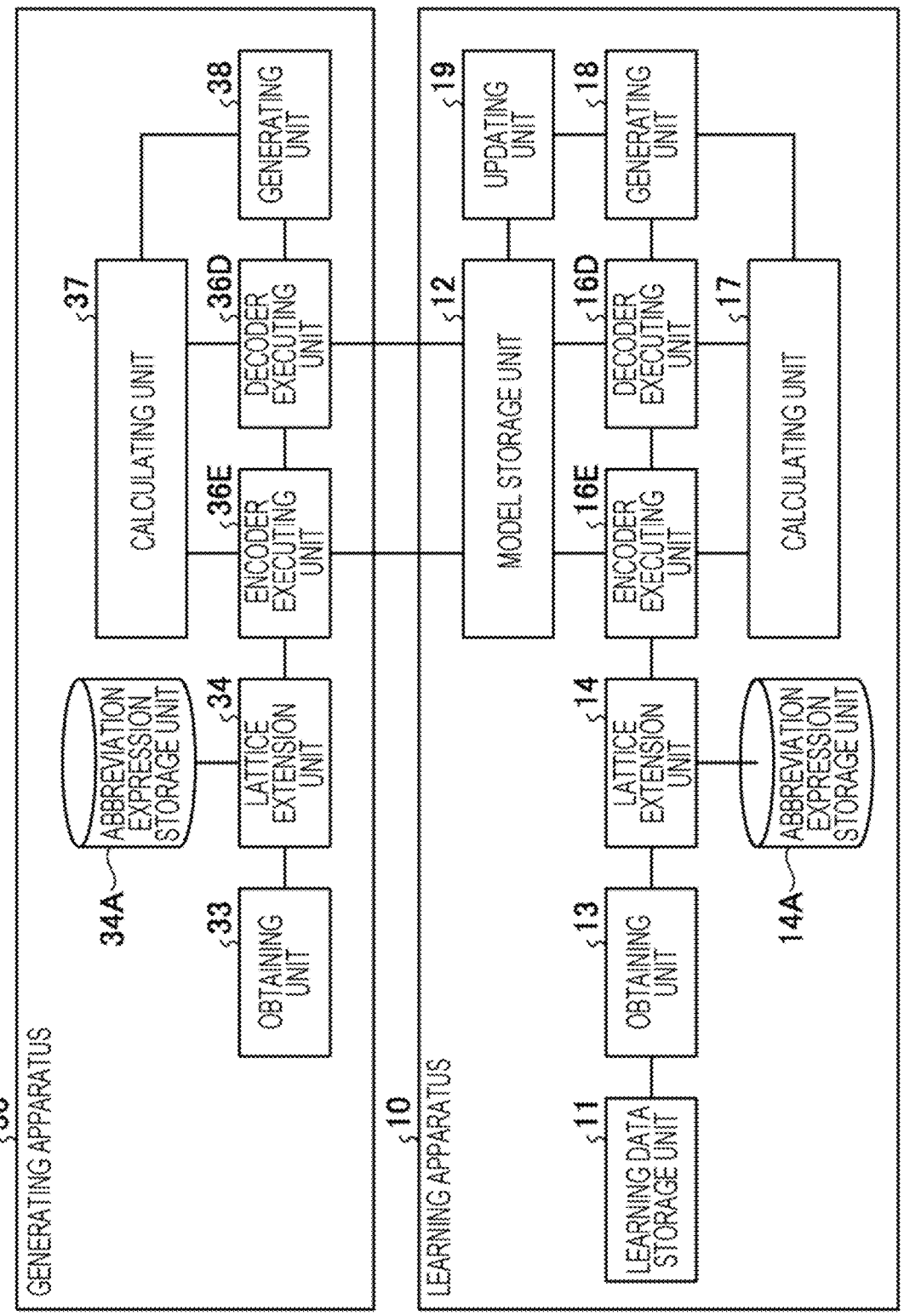
FIG. 1 is a block diagram illustrating functional configurations of apparatuses included in a system according to Embodiment 1.

FIG. 1 is a block diagram illustrating functional configurations of apparatuses included in a system according to Embodiment 1. A system 1 illustrated in FIG. 1 provides a machine learning service that performs machine learning on a model by using learning data including input text for learning and correct answer summaries and a summary generation service that generates a summary from input text by using the trained model.

As Illustrated in FIG. 1, the system 1 includes a learning apparatus and a generating apparatus 30. By receiving a model having learned in the learning apparatus 10, the generating apparatus 30 generates a result from data given thereto. Both of these learning apparatus 10 and generating apparatus correspond to an example of a summary generating apparatus.

The learning apparatus 10 corresponds to an example of a computer that provides the machine learning service. In a case where the learning apparatus 10 and the generating apparatus 30 are deployed in different computers, the model is passed through network communication.

According to an embodiment, the learning apparatus 10 may be implemented by installing, to a desired computer, a learning program configured to achieve the machine learning service as package software or online software. The thus installed learning program is executed by a computer so that the computer may function as the learning apparatus 10.

As an example, the learning apparatus 10 may be implemented as a server apparatus that accommodates the generating apparatus 30 as a client and that provides the machine learning service to the client. In this case, the learning apparatus 10 may be implemented as a server configured to provide the machine learning service on premise or may be implemented as a cloud configured to provide the machine learning service by outsourcing.

For example, the learning apparatus 10 receives input of learning data including a plurality of learning samples or identification information with which learning data may be invoked over network communication or through a storage medium and outputs a learning result of the model to the generating apparatus 30. In this case, as an example, the learning apparatus 10 may provide parameters of the model of a neural network to which an RNN encoder and an RNN decoder are coupled. In addition, the learning apparatus 10 may provide an application program functionally including summary generation implemented by using a trained model. For example, the learning apparatus 10 may provide an application program that generates, as a summary, an article title from original text of an article in newspaper, an electric bulletin board, a web site or the like or generates a prompt report from original text of such an article as a summary.

The forms of provision of the machine learning service are examples, and the machine learning service may be provided in provision forms other than the examples described above. For example, the learning program itself that implements the machine learning service may be provided as package software or online software, or a computer incorporating the learning program may be provided.

The generating apparatus 30 corresponds to an example of a computer that provides the summary generation service.

According to an embodiment, the generating apparatus 30 may be implemented by installing, to a desired computer, a summary generating program configured to achieve the summary generation service as package software or online software. The thus installed summary generating program is executed by a computer so that the computer may function as the generating apparatus 30.

As an example, the summary generation service may be provided as one such as "article summarization tool" of tools of web services provided for media operators who run media such as a newspaper, an electric bulletin board, and a web site. In this case, frontend functions such as input of original text and display of a summary among functions provided as the web services may be implemented in a terminal apparatus of a journalist, an editor or the like, and backend functions such as generation of a summary may be implemented in the generating apparatus 30.

Example of Use Case of Article Summarization Tool

Figure 2:
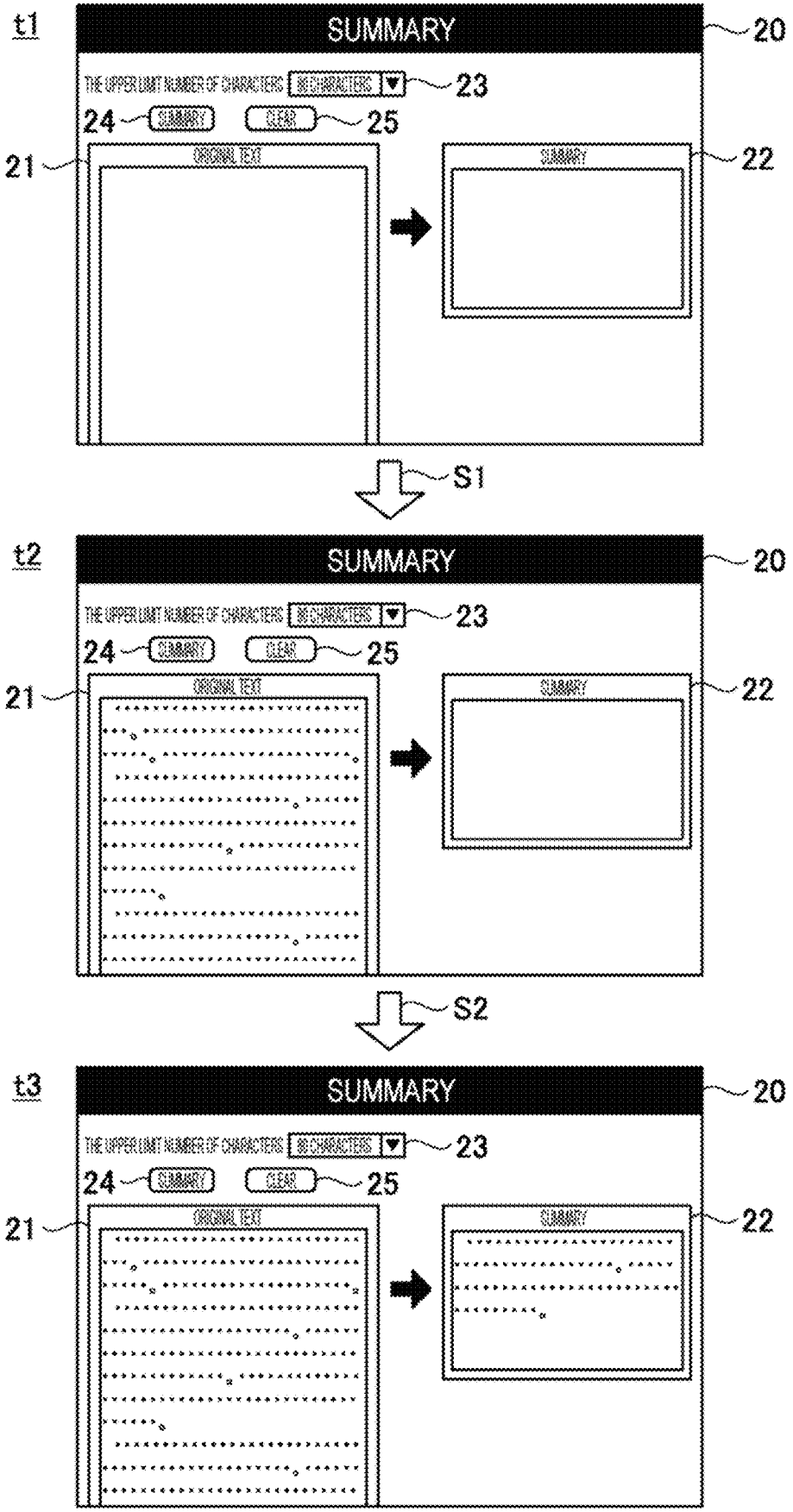
FIG. 2 is a diagram illustrating an example of a use case of an article summarization tool.

FIG. 2 is a diagram illustrating an example of a use case of an article summarization tool. FIG. 2 illustrates an example of a transition of an article summarization screen 20 displayed on a terminal apparatus used by a person associated with a media operator.

At a time t1 of FIG. 2, the article summarization screen 20 at an initial state without any input set for items is illustrated. For example, the article summarization screen 20 includes graphical user interface (GUI) components such as an original text input area 21, a summary display area 22, a pull-down menu 23, a summarization button 24, and a clear button 25. Among them, the original text input area 21 corresponds to an area in which original text such as an article is to be input. The summary display area 22 corresponds to an area that displays a summary corresponding to the original text input to the original text input area 21. The pull-down menu 23 corresponds to an example of a GUI component with which the upper limit number of characters of the summary is designated. The summarization button 24 corresponds to an example of a GUI component that receives execution of a command for generating a summary corresponding to original text input to the original text input area 21. The clear button 25 corresponds to an example of a GUI component that dears the original text input to the original text input area 21.

As illustrated in FIG. 2, in the original text input area 21 on the article summarization screen 20, input of text may be received through an input device such as a keyboard, not illustrated. Text may be imported from a file of a document generated by an application such as word processor software to the original text input area 21, in addition to reception of input of text through an input device.

In response to such input of original text to the original text input area 21, the article summarization screen 20 is shifted from the state illustrated at the time t1 of FIG. 2 to a state illustrated at a time t2 of FIG. 2 (step S1). For example, when original text is input to the original text input area 21, execution of a command that generates a summary may be received through an operation performed on the summarization button 24. The text input to the original text input area 21 may be cleared through an operation performed on the clear button 25. In addition, through the pull-down menu 23, designation of the upper limit number of characters desired by a person associated with a media operator from a plurality of upper limit numbers of characters may be received. FIG. 2 illustrates an example in which 80 characters corresponding to an example of the upper limit number of characters displayable on an electric bulletin board is designated as an example of a scene where a prompt report to be displayed on the electric bulletin board is generated as a summary from original text of an article in a newspaper or news. This is given for illustration purpose, and the upper limit number of characters corresponding to a title may be selected in a case where the title is generated from an article in a newspaper or a website.

When an operation is performed on the summarization button 24 in the state that the original text input area 21 has original text, the article summarization screen 20 is shifted from the state at the time t2 of FIG. 2 to a state at a time t3 of FIG. 2 (step S2). In this case, the original text input to the original text input area 21 is input to the trained model as input text to generate its summary. This summary generation may be executed on a terminal apparatus of a person who associated with a media operator or may be executed on a backend server apparatus. After a summary is generated in this manner, the summary display area 22 on the article summarization screen 20 displays the summary generated by the trained model.

The text of the summary displayed in the summary display area 22 on the article summarization screen 20 may be edited through an input device, for example, not illustrated.

The provision of the article summarization tool allows reduction of article summarization works performed by a journalist, an editor or the like. For example, from one point of view, article summarization works require relatively large labor in a process for distributing news to media including "selection of an article to be distributed", "transmission to a media editing system", "article summarization", "title generation" and "proofreading". For example, in a case where the article summarization is performed by a human, works are required including selecting important information from a whole article and reconstructing sentences. Therefore, the technical meaning of automation or semi-automation of such article summarization works is significant.

Having described the use case in which the article summarization tool is used by a person associated with a media operator, for example, the article summarization tool may be used by a reader who receives distribution of an article from the media operator. For example, through a smart speaker or the like, the article summarization tool may be used as a function that reads aloud a summary of an article instead of a function that reads aloud whole text.

Having described that the generating apparatus 30 is implemented as a computer that provides the summary generation service as an example, embodiments are not limited thereto. For example, a summary generating program incorporating the trained model may be implemented as a standalone application program executed in an arbitrary computer such as a terminal apparatus of a journalist, an editor or the like.

Having described that the machine learning service and the summary generation service are executed by different business entities, these two services may be provided by one business entity. In this case, the learning program and the summary generating program may be executed by one computer or computer system.

RNN+Pointer-Gen

In the learning apparatus 10 and the generating apparatus 30, a model combining RNN and Pointer-Gen is applied. From a model combining RNN and Pointer-Gen, words of a summary may be output based on generation probabilities of words included in input text in addition to generation probabilities of words output by the RNN decoder. Thus, a summary may be generated including an unknown word that does not exist in a dictionary of the RNN model.

One Aspect of Problem

As described in Background section, a failure to omit a phrase included in input text from the model combining RNN and Pointer-Gen may not be suppressed.

This is because a word in input text is just copied as a word in a summary even from the combination of RNN and Pointer-Gen. By just copying a word in input text, there is a limitation that a phrase is shortened by omitting a part of words included in the phrase including a plurality of words. Thus, cases where omission of a phrase fails may occur.

In other words, a phrase is not necessarily shortened by omitting a word. For example, a part of characters in a character string included in a phrase may be extracted and be omitted.

As an example, giving an example of a phrase in Japanese, "全日本柔道連盟" is correctly abbreviated as "全柔連". However, the RNN+Pointer-Gen model copies words "全", "日本", "柔道" and "連盟" included in the phrase "全日本柔道連盟" and therefore may not output the correct abbreviation "全柔連" as a word of a summary.

This problem is not limited to a case where the language is Japanese. For example, from an English phrase "North Atlantic Treaty Organization", English words "North", "Atlantic", "Treaty", and "Organization" are output, which is a limitation of the model. A summary including the correct abbreviation, so called an acronym "NATO" may not be output.

One Aspect of Problem Solution

Accordingly, in embodiments, in a lattice serially coupling nodes corresponding to words in input text, nodes of a section corresponding to a predetermined expression are extended. Then, elements of a summary are output based on generation probabilities of the nodes of the extended lattice and the generation probabilities of words in a model dictionary.

As an example, in embodiments, a word N-gram of a word string dividing input text hits in a dictionary of abbreviation expressions for phrases, a node corresponding to the abbreviation expression is added to the section of the word N-gram to extend the lattice. This extension of the lattice allows the RNN+Pointer-Gen model to copy not only words in input text but also an abbreviation expression of a phrase included in the input text as an element of a summary.

Therefore, the failure of omission of a phrase included in input text may be suppressed according to embodiments.

Configuration of Learning Apparatus 10

As Illustrated in FIG. 1, the learning apparatus 10 includes a learning data storage unit 11, a model storage unit 12, an obtaining unit 13, an abbreviation expression storage unit 14A, a lattice extension unit 14, an encoder executing unit 16E, a decoder executing unit 16D, a calculating unit 17, a generating unit 18, and an updating unit 19. In addition to the functional units illustrated in FIG. 1, the learning apparatus 10 may include various functional units that known computers usually include, such as various input devices (a microphone and/or an image sensor) and various audio output devices (such as a speaker).

The functional units such as the obtaining unit 13, the lattice extension unit 14, the encoder executing unit 16E, the decoder executing unit 16D, the calculating unit 17, the generating unit 18, and the updating unit 19 illustrated in FIG. 1 are given for illustration purpose and may be implemented virtually by the following hardware processor. Examples of such a processor include a deep learning unit (DLU), general-purpose computing on graphics processing units (GPGPU) and a GPU duster. Examples of the processor further include a central processing unit (CPU) and a microprocessor unit (MPU). In other words, for example, the processor expands the learning program as a process on a memory such as a random-access memory (RAM) to virtually implement the aforementioned functional units. Although the DLU, the GPGPU, the GPU duster, the CPU and the MPU are exemplified as one example of the processor here, the functional units may be implemented by any processor regardless of whether the processor is a general-purpose type or a special type. In addition, the functional units described above may be implemented by a hard wired logic circuit such as an application specific integrated circuit (ASIC) or a field-programmable gate array (FPGA).

The functional units such as the learning data storage unit 11, the model storage unit 12 and the abbreviation expression storage unit 14A illustrated in FIG. 1 may be a storage device such as a hard disk drive (HDD), an optical disk or a solid state drive (SSD). The storage device may not be an auxiliary storage device but may be a semiconductor memory element such as a RAM, an EPPROM or a flash memory.

The learning data storage unit 11 is a storage unit that stores learning data. Here, the learning data include D learning samples, that is, learning instances, as an example. Each of the learning samples includes a pair of input text and a summary as a correct answer to be used for model learning. Hereinafter, the input text may be called a "learning input text" from a viewpoint that it is used for identifying a label of input text to be input for model learning and for summary generation. This is identification of the labels, and they still correspond to an example of input text. The summary as a correct answer may be called a "correct answer summary" from a viewpoint that it is used for identifying labels of a summary referred as a correct answer and a summary generated from input text for model learning.

The model storage unit 12 is a storage unit that stores information regarding a model.

According to an embodiment, the model storage unit 12 stores a model layer structure such as neurons and synapses of layers including an input layer, a hidden layer and an output layer forming a model of a neural network in which an RNN encoder and an RNN decoder are coupled and model information including parameters of the model such as weights and biases in the layers. In a stage before model learning is executed, the model storage unit 12 stores parameters initially set with random numbers as the parameters in the model. In a stage after the model learning is executed, the model storage unit 12 stores parameters in the trained model.

The obtaining unit 13 is a processing unit that obtains a learning sample.

According to an embodiment, the obtaining unit 13 starts processing in response to reception of a request for model learning. When the processing is started, the obtaining unit 13 performs initial setting for model learning. For example, the obtaining unit 13 sets the number of characters of a correct answer summary or the number of characters defined by a user as the upper limit number of characters of the summary to be generated by the model. The obtaining unit 13 initializes the value of a loop counter d that counts the number of learning samples. Then, the obtaining unit 13 obtains the learning sample corresponding to the value of the loop counter d of D learning samples stored in the learning data storage unit 11. After that, the obtaining unit 13 increments the value of the loop counter d and repeatedly executes processing for obtaining learning samples from the learning data storage unit 11 until the value of the loop counter d is equal to the total number D of the learning samples. Having described the example in which learning data stored in an internal storage of the learning apparatus 10 is obtained, the information source of the learning data is not limited to the internal storage. For example, learning data may be obtained from an external computer such as a file server or a removable medium or the like.

The lattice extension unit 14 is a processing unit that extends a lattice acquired by serially coupling nodes corresponding to words included in learning input text.

According to an embodiment, the lattice extension unit 14 executes morphological analysis on learning input text included in a learning sample when the learning sample is obtained by the obtaining unit 13. Execution of the morphological analysis thereon divides the learning input text into word strings. Then, the lattice extension unit 14 generates a lattice acquired by serially coupling nodes corresponding to words included in learning input text.

(1) First Extension

According to one aspect, the lattice extension unit 14 extends the lattice by using an abbreviation expression dictionary stored in the abbreviation expression storage unit 14A. For example, the lattice extension unit 14 extracts a predetermined number of words such as a word N-gram of word strings in the learning input text. Next, the lattice extension unit 14 searches an abbreviation expression corresponding to the word N-gram in the learning input text from the abbreviation expression dictionary. For example, the abbreviation expression dictionary may include data having a phrase and its abbreviation expression in association. As an example, if the language is Japanese, the abbreviation expression dictionary includes an entry having a phrase "全日本柔道連盟" and its abbreviation expression "全柔連" in association and an entry having a phrase "全日本連盟" and its abbreviation expression "全日連" a in association. In the abbreviation expression dictionary, in a case where any abbreviation expression hits with the word N-gram in the learning input text, the lattice extension unit 14 executes the following processing. That is, the lattice extension unit 14 adds a node corresponding to an abbreviation expression hit with the word N-gram in the learning input text to the section corresponding to a word N-gram in the learning input text of the lattice.

(2) Second Extension

According to another aspect, the lattice extension unit 14 extends a lattice by using a named entity extractor. For example, the lattice extension unit 14 extracts a named entity from input text included in a learning sample. For example, the lattice extension unit 14 executes morphological analysis on input text. By using the result of the morphological analysis, the lattice extension unit 14 executes labeling processing that gives a label relating to a named entity (NE) corresponding to the position of the word for each word included in the input text. For example, to each word in input text, a label "Y" corresponding to a named entity or a label "N" not corresponding to a named entity is given. This labeling processing may use an arbitrary engine for named entity extraction, that may be open-source software. Thus, a named entity is extracted for each word in input text. After a named entity is extracted from input text, the lattice extension unit 14 searches an abbreviation expression corresponding to the named entity from the abbreviation expression dictionary. In the abbreviation expression dictionary, in a case where any abbreviation expression hits with the named entity, the lattice extension unit 14 executes the following processing. That is, the lattice extension unit 14 adds a node corresponding to an abbreviation expression hit with the named entity to the section corresponding to the named entity in the lattice.

The thus generated lattice is extended by using the abbreviation expression dictionary with which abbreviation expressions relating to phrases are registered or named entity extraction or the like.

The encoder executing unit 16E is a processing unit that executes an RNN encoder. The following LSTM stands for Long Short-Term Memory.

According to an embodiment, the encoder executing unit 16E expands, on a work area, M LSTMs corresponding to the number M of nodes of an extended learning input text lattice, which is extended by the lattice extension unit 14, in accordance with model information stored in the model storage unit 12. Hereinafter, a lattice after extension by the lattice extension unit 14 may be called "extended lattice". A lattice at an initial stage generated by serially coupling nodes corresponding to words in input text may be called "Initial lattice" for distinction from the label "extended lattice". Thus, M LSTM cells are caused to function as an RNN encoder. For example, the encoder executing unit 16E inputs a word or an abbreviation expression corresponding to the mth node from the beginning of the extended lattice to the LSTM cell corresponding to the mth node in order from the first node of the extended lattice. The encoder executing unit 16E further inputs an output of the LSTM cell corresponding to the (m−1)th node to the LSTM cell corresponding to the mth node. By repeating this input from the LSTM corresponding to the first node to the LSTM cell corresponding to the Mth word at the end, vectors, that is, hidden states of the learning input text are acquired. Thus, the hidden states of the learning input text generated by the RNN encoder are input to the RNN decoder.

The decoder executing unit 16D is a processing unit that executes an RNN decoder.

According to an embodiment, the decoder executing unit 16D expands, on a work area, N LSTM cells corresponding to the number N of words in the correct answer summary based on model information stored in the model storage unit 12. Thus, the N LSTM cells are functioned as an RNN decoder. For example, the decoder executing unit 16D inputs the hidden states output from the RNN encoder, a tag for a beginning of a sentence called Begin of Sentence (BOS) and the upper limit number of characters to the LSTM cell corresponding to the first word of the correct answer summary. After that, the decoder executing unit 16D executes the following input to the LSTM cell corresponding to the nth word from the beginning of the correct answer summary. That is, to the LSTM cell corresponding to the nth word, the (n−1)th word from the beginning of the correct answer summary, the number of remaining characters up to the output of the End of Sentence (EOS) tag, and the hidden state output by updating the LSTM cell corresponding to the (n−1)th word are input. By operating N LSTM cells, the RNN decoder outputs a distribution of generation probabilities of words for each set of N LSTM cells to the generating unit 18. The term "word" here refers to a word that is present in a model dictionary included in the RNN model and, for example, is acquired from a word appearing in learning input text in the entire learning samples.

The calculating unit 17 is a processing unit that calculates a generation probability of each node of an extended lattice.

As an example, the nth element from the beginning of a summary, that is, a word in a model dictionary or a word or abbreviated expression corresponding to a node of an extended lattice is to be generated. In this case, for each set of M nodes included in an extended lattice, the calculating unit 17 calculates, as a score, a similarity such as an inner product of the hidden states output by the LSTM cells of the RNN encoder corresponding to the nodes and a hidden state updated by the nth LSTM cell in the RNN decoder. Then, the calculating unit 17 normalizes a score of each node such that a total of scores of all nodes is equal to "1". Thus, the normalized scores are acquired as generation probabilities.

The generating unit 18 is a processing unit that generates an element of a summary.

According to an embodiment, the generating unit 18 combines a generation probability of each word in a model dictionary output from the nth LSTM cell of the RNN decoder executed by the decoder executing unit 16D and a generation probability of each node of the extended lattice calculated by the calculating unit 17. For example, the generating unit 18 performs linear combination on a generation probability $p_{vocabulary}$ of each word in the model dictionary and a generation probability $p_{attention}$ of each node of the extended lattice in accordance with the following expression (1) to calculate the generation probability p of each element. The generation probability p of an element is calculated by defining the value of the generation probability $p_{vocabulary}$ of a word or abbreviation expressions corresponding to each node of the extended lattice being an unknown word which does not present in the model dictionary as zero. Furthermore, the generation probability p of an element may be calculated by giving a weight discussed in Abigail See, Peter J. Liu, Christopher D. Manning "Get To The Point: Summarization with Pointer-Generator Networks" ACL 2017 to the generation probability $p_{vocabulary}$ of a word and the generation probability $p_{attention}$ of a node of the extended lattice. After that, the generating unit 18 generates an element having the highest generation probability p as the nth word from the beginning of the summary.

$$p = p_{vocabulary} + p_{attention} \quad (1)$$

The updating unit 19 is a processing unit that updates parameters in a model.

According to an embodiment, when the nth word of a summary is generated by the generating unit 18, the updating unit 19 calculates a loss from the nth word of words included in the correct answer summary and the nth word generated by the generating unit 18. Then, when a loss for each set of N LSTMs in the RNN decoder is calculated, the updating unit 19 executes log-likelihood optimization based on the loss of each LSTM so that parameters to update the model of the RNN are calculated. Then, the updating unit 19 updates the parameters in the model stored in the model storage unit 12 with the parameters acquire by the log-likelihood optimization. This parameter update may be repeatedly executed over all learning samples and may be repeatedly executed over a predetermined number of epochs of learning data D.

Specific Example of Model Learning

Cases of generation of a summary in a technology in the past and in this embodiment will be compared by describing specific examples of model learning below with reference to FIGS. 3A and 3B to 7.

Figures 3A, 3B:
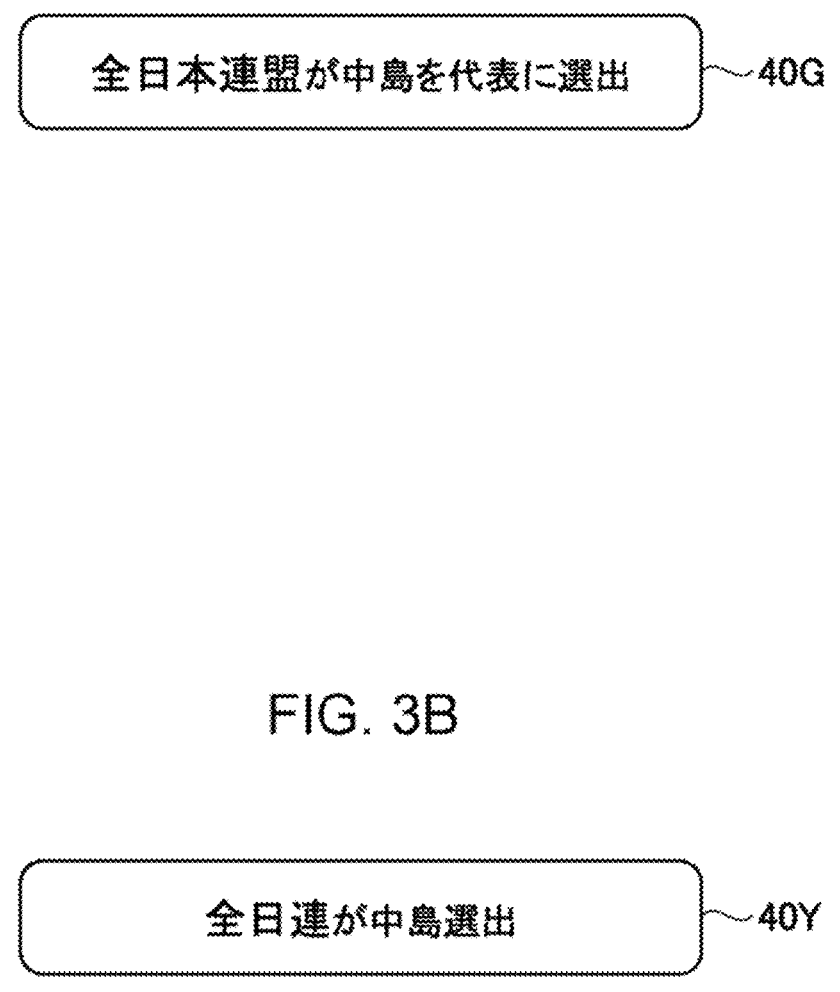
Figure 4:
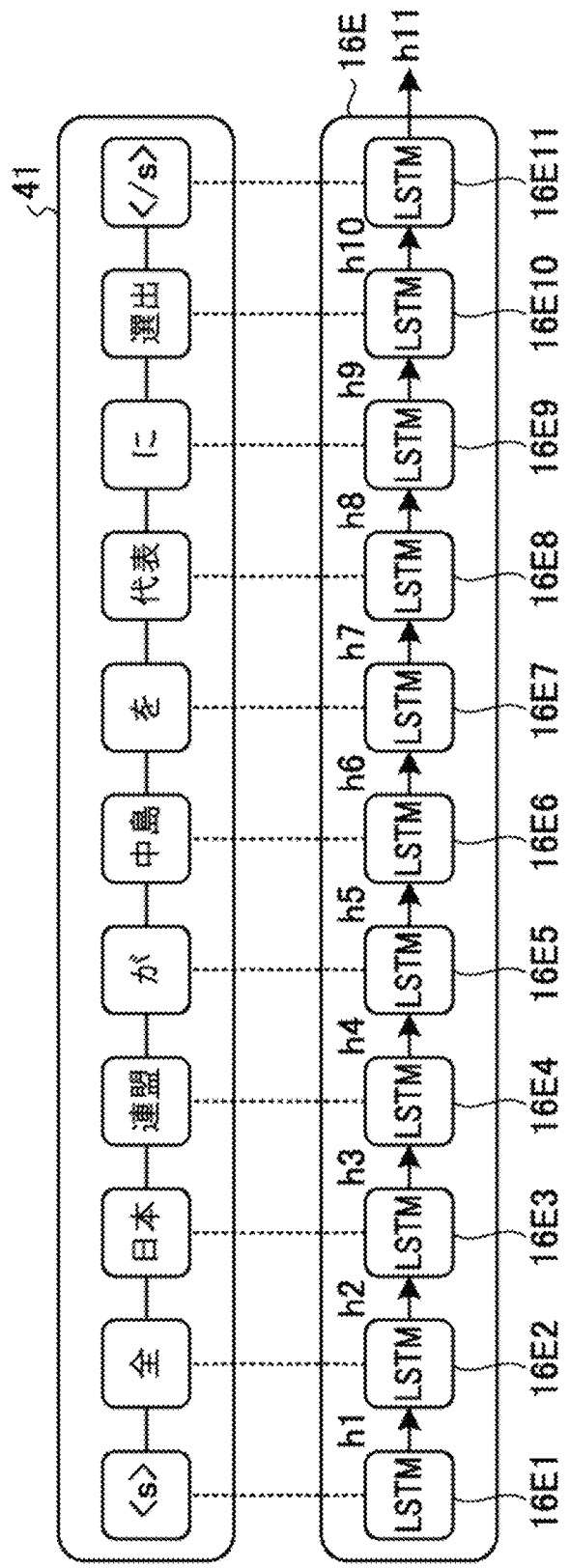
FIG. 4 is a diagram illustrating an example of an initial lattice.
Figure 5:
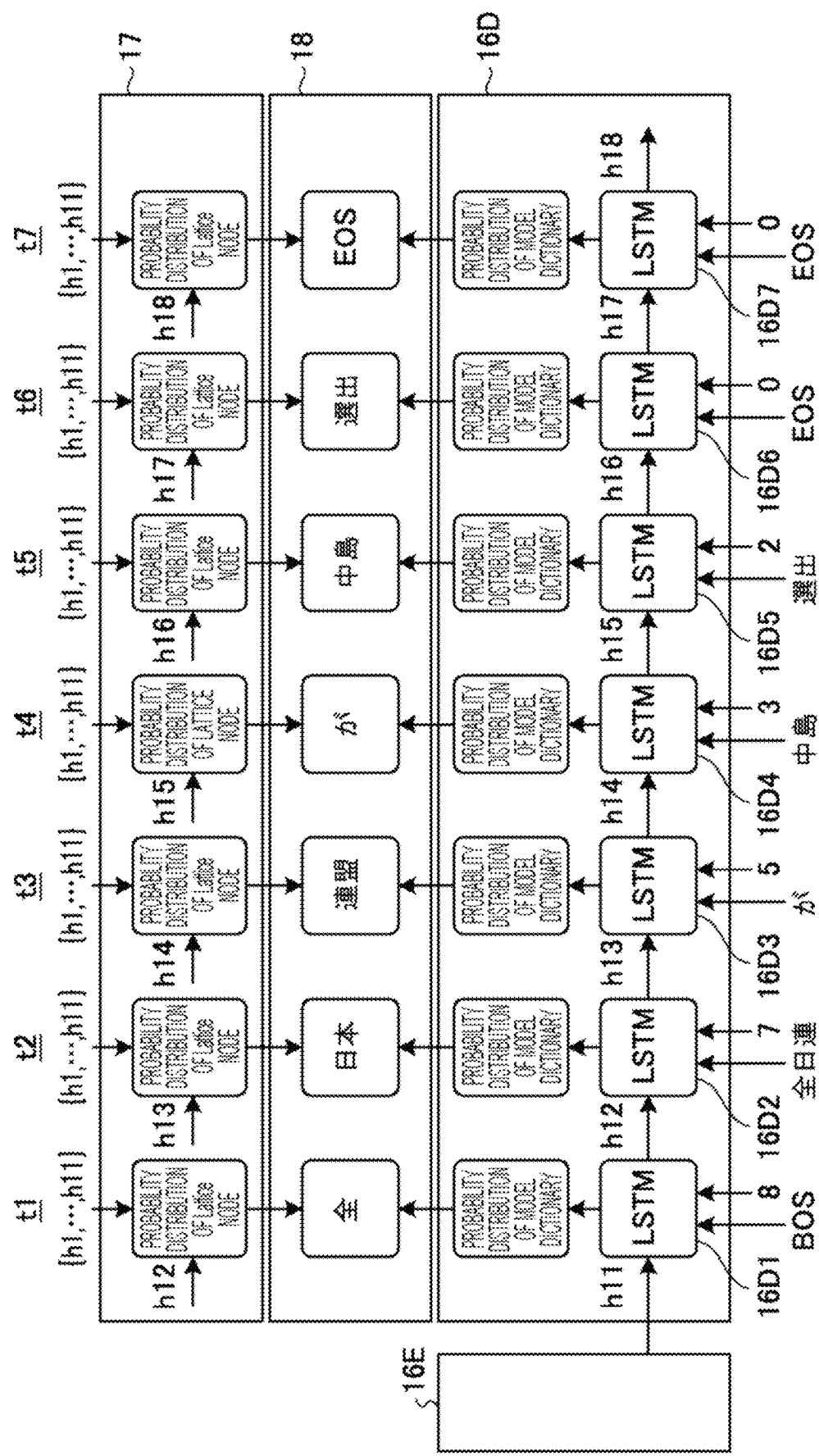
FIG. 5 is a diagram illustrating a case where a summary is generated according to a technology in the past.
Figure 6:
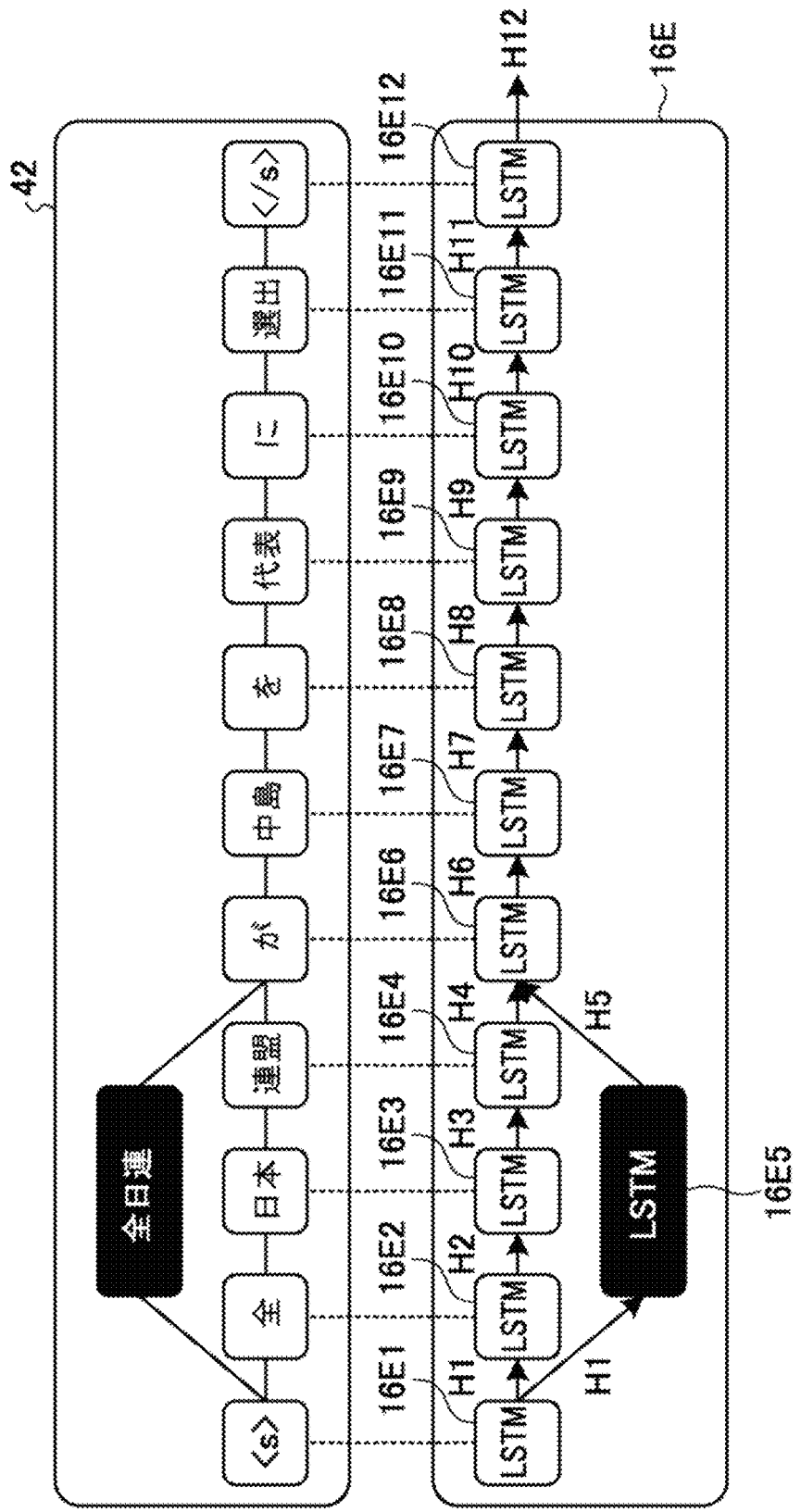
FIG. 6 is a diagram illustrating an example of an extended lattice.
Figure 7:
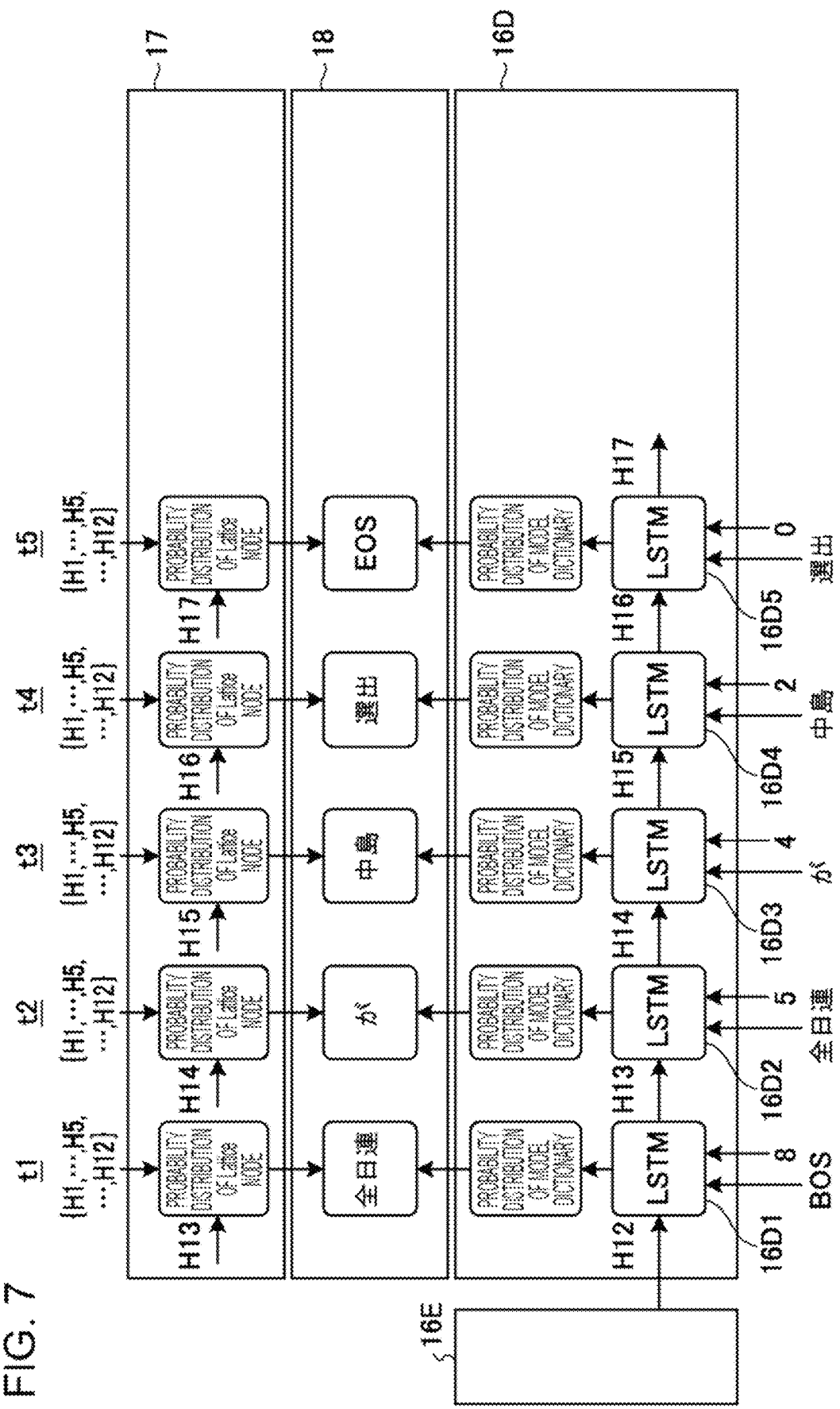
FIG. 7 is a diagram illustrating a case where a summary is generated according to Embodiment 1.

FIGS. 3A and 3B exemplarily illustrate an example of a learning sample to be input to the model. FIG. 3A is a diagram illustrating an example of learning input text. FIG. 3B is a diagram illustrating an example of a correct answer summary. FIG. 4 is a diagram illustrating an example of an initial lattice. FIG. 5 is a diagram illustrating a case where a summary is generated according to a technology in the past. FIG. 6 is a diagram illustrating an example of an extended lattice. FIG. 7 is a diagram illustrating a case where a summary is generated according to Embodiment 1.

In a case where learning input text 40G illustrated in FIG. 3A is input, an initial lattice 41 is generated in which nodes corresponding to the words in the learning input text 40G are serially coupled, as illustrated in FIG. 4.

(1) Technology in the Past

In a case where model learning is performed according to a technology in the past, LSTM cells in the RNN encoder are generated based on the initial lattice 41. With reference to the example illustrated in FIG. 4, eleven cells of LSTMs 16E1 to 16E11 in the RNN encoder corresponding to the number M (=11) of nodes from the first node "<s>" to the end node "</s>" sequentially in the initial lattice 41 are expanded on a work area. The hidden state is updated and is propagated from LSTM 16E1 to 16E11, and the hidden state h11 is acquired from the RNN encoder.

On the other hand, as illustrated in FIG. 5, seven LSTM cells in the RNN decoder are expanded on the work area which corresponds to the number N(=7) of words included in a correct answer summary 40Y illustrated in FIG. 3B. Hereinafter, LSTM cells expanded on the work area, which correspond to words in order from the first word in the correct answer summary 40Y, are identified as "LSTM 16D1 to LSTM 16D7".

For example, at the first time t1 when the first element of the summary is generated, the hidden state h11 output from the RNN encoder, the BOS tag, and the number of remaining characters of the summary such as the number "8" of characters of the correct answer summary 40Y are input to the first LSTM 16D1 cell of the RNN decoder. As a result, the LSTM 16D1 cell in the RNN decoder calculates the generation probability of each word in the model dictionary to calculate the generation probability p of each word at the first time t1 and updates the hidden state h11 to the hidden state h12.

By using the hidden state h12 output by the LSTM 16D1 cell of the RNN decoder, the calculating unit 17 calculates generation probability of a set of eleven nodes included in the extended lattice. For example, the generation probability for the node " 全 " in the initial lattice 41 is calculated. In this case, the similarity is calculated as a score between the hidden state h2 output by the LSTM 16E2 cell of the RNN encoder corresponding to the node " 全 " of the initial lattice 41 and the hidden state h12 updated by the LSTM 16D1 cell in the RNN decoder. In this manner, scores for all nodes included in the initial lattice 41 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element " 全 " having the highest generation probability p at the first time t1. By subtracting the number "1" of characters for the word " 全 " generated at the first time t from the initial value "8" of the number of remaining characters, the value of the number of remaining characters is updated to "7".

Next, at the second time t2 when the first element of the summary is to be generated, the hidden state h12 output from the LSTM 16D1 encoder at one previous time of the RNN decoder, the word " 全日連 " of the correct answer at one previous time and the number "7" of remaining characters of the summary are input to the second LSTM 16D2 cell from the beginning of the RNN decoder. As a result, the LSTM 16D2 cell in the RNN decoder calculates the generation probability of each word in the model dictionary to calculate the generation probability $p_{vocabulary}$ of each word at the second time t2 and updates the hidden state h12 to the hidden state h13.

By using the hidden state h13 output by the LSTM 16D2 cell of the RNN decoder, the calculating unit 17 calculates generation probability of a set of eleven nodes included in the extended lattice. For example, the generation probability for the node " 日本 " in the initial lattice 41 is calculated. In this case, the similarity is calculated as a score between the hidden state h3 put by the LSTM 16E3 cell of the RNN encoder corresponding to the node " 日本 " of the initial lattice 41 and the hidden state h13 updated by the LSTM 16D2 cell in the RNN decoder. In this manner, scores for all nodes included in the initial lattice 41 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element " 日本 " having the highest generation probability p at the second time t2. By subtracting the number "2" of characters for the word " 日本 " generated at the second time t2 from the initial value "7" of the number of remaining characters, the value of the number of remaining characters is updated to "5".

This processing is repeatedly executed up to the seventh time t7 where the sentence end symbol "EOS" is output from the LSTM 16D7. As a result, according to the technology in the past, the summary " 全日本連盟が中島進出 " is acquired. Apparently from the comparison between the result and the correct answer summary 40Y, the summary includes the phrase " 全日本連盟 " as it is though the phrase " 全日本連盟 " is supposed to be abbreviated to the abbreviation expression " 全日連 ". According to the technology in the past, the abbreviation from the phrase " 全日本連盟 " to the abbreviation expression " 全日連 " falls, and the number of characters is apparently more than the upper limit number "8" of characters.

(2) This Embodiment

On the other hand, in a case where model learning is performed according to this embodiment, the initial lattice 41 is not used for the generation of LSTM cells in the RNN encoder, unlike the technology in the past. In other words, for example, the abbreviation expression " 全日連 " corresponding to the word trigram " 全日本連盟 " in the learning input text 40G is retrieved from the abbreviation expression dictionary. Thus, the initial lattice 41 illustrated in FIG. 4 is extended to the extended lattice 42 illustrated in FIG. 6. In other words, for example, as highlighted in FIG. 6, the node corresponding to the abbreviation expression " 全日連 " hit with the word trigram " 全日本連盟 " of the learning input text 40G is added to the section corresponding to the word trigram " 全日本連盟 " in the learning input text 40G.

This extended lattice 42 is used for generation of LSTM cells in the RNN encoder. With reference to the example illustrated in FIG. 6, twelve cells of LSTMs 16E1 to 16E12 in the RNN encoder corresponding to the number M (=12) of nodes from the first node "<s>" to the end node "</s>" sequentially in the extended lattice 42 are expanded on a work area. The hidden state is updated and is propagated from LSTM 16E1 to 16E12, and the hidden state h12 is acquired from the RNN encoder.

On the other hand, as illustrated in FIG. 7, five LSTM cells in the RNN decoder are expanded on the work area which corresponds to the number N(=5) of words included in a correct answer summary 40Y illustrated in FIG. 3B. Hereinafter, LSTM cells expanded on the work area, which correspond to words in order from the first word in the correct answer summary 40Y, are identified as "LSTM 16D1 to LSTM 16D5".

For example, at the first time t1 when the first element of the summary is generated, the hidden state H12 output from the RNN encoder, the BOS tag, and the number of remaining characters of the summary such as the number "8" of characters of the correct answer summary 40Y are input to the first LSTM 16D1 cell of the RNN decoder. As a result, the LSTM 16D1 cell in the RNN decoder calculates the generation probability of each word in the model dictionary to calculate the generation probability $p_{vocabulary}$ of each word at the first time t1 and updates the hidden state H12 to the hidden state H13.

By using the hidden state H13 output by the LSTM 16D1 cell of the RNN decoder, the calculating unit 17 calculates generation probability of a set of twelve nodes included in the extended lattice. For example, the generation probability for the node "全日連" in the extended lattice 42 is calculated. In this case, the similarity is calculated as a score between the hidden state H5 output by the LSTM 16E5 cell of the RNN encoder corresponding to the node "全日連" of the extended lattice 42 and the hidden state H13 updated by the LSTM 16D1 cell in the RNN decoder. In this manner, scores for all nodes included in the extended lattice 42 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element "全日連" having the highest generation probability p at the first time t1. By subtracting the number "3" of characters for the word "全日連" generated at the first time t1 from the initial value "8" of the number of remaining characters, the value of the number of remaining characters is updated to "5".

This processing is repeatedly executed up to the fifth time t5 where the sentence end symbol "EOS" is output from the LSTM 16D5. As a result, according to this embodiment, the summary "全日連が中島選出" is acquired. Apparently from the comparison between this result and the correct answer summary 40Y, the phrase "全日本連盟" is abbreviated to the abbreviation expression "全日連" in this embodiment. According to this embodiment, a summary including the abbreviation expression "全日連" may be generated.

Configuration of Generating Apparatus 30

As Illustrated in FIG. 1, the generating apparatus 30 includes an obtaining unit 31, an abbreviation expression storage unit 34A, a lattice extension unit 34, an encoder executing unit 36E, a decoder executing unit 36D, a calculating unit 37, and a generating unit 38. In addition to the functional units illustrated in FIG. 1, the generating apparatus 30 may include various functional units that known computers usually include, such as various input devices (a microphone and/or an image sensor) and various audio output devices (such as a speaker).

The functional units such as the obtaining unit 31, the lattice extension unit 34, the encoder executing unit 36E, the decoder executing unit 36D, the calculating unit 37, and the generating unit 38 illustrated in FIG. 1 are given for illustration purpose and may be implemented virtually by the following hardware processor. Examples of such processors include a DLU, a GPGPU and a GPU duster. Examples of the processors may further include a CPU and an MPU. In other words, for example, the processor expands the summary generating program as a process on a memory such as a RAM to virtually implement the aforementioned functional units. Although the DLU, the GPGPU, the GPU duster, the CPU and the MPU are exemplified as one example of the processor here, the functional units may be implemented by any processor regardless of whether the processor is a general-purpose type or a special type. In addition, the functional units described above may be implemented by a hard wired logic circuit such as an ASIC or FPGA.

The functional units such as the abbreviation expression storage unit 34A illustrated in FIG. 1 may be a storage device such as an HDD, an optical disk and an SSD. The storage device may not be an auxiliary storage device but may be a semiconductor memory element such as a RAM, an EPPROM or a flash memory.

The obtaining unit 33 is a processing unit that obtains input text.

According to an embodiment, the obtaining unit 33 starts processing in response to reception of a request for summary generation. When the processing starts, the obtaining unit 33 obtains input text for which a summary is to be generated. The obtaining unit 33 further receives designation of the upper limit number of characters of a summary to be generated by a trained model. After that, the obtaining unit 33 initializes the value at a register holding the number of remaining characters until an EOS being a sentence end symbol is output to the RNN decoder to the designated upper limit number of characters.

The lattice extension unit 34 is a processing unit that extends an initial lattice acquired by serially coupling nodes corresponding to words included in input text.

According to an embodiment, the lattice extension unit 34 executes morphological analysis on input text when the input text is obtained by the obtaining unit 33. Execution of the morphological analysis thereon divides the input text into word strings. Then, the lattice extension unit 34 generates an initial lattice acquired by serially coupling nodes corresponding to words in input text.

After an initial lattice is generated, the lattice extension unit 34 extends the lattice by using an abbreviation expression dictionary stored in the abbreviation expression storage unit 34A. For example, the lattice extension unit 34 extracts a predetermined number of words such as a word N-gram of word strings in the input text. Next, the lattice extension unit 34 searches an abbreviation expression corresponding to the word N-gram in the input text from the abbreviation expression dictionary. The abbreviation expression dictionary stored in the abbreviation expression storage unit 34A may be the same as the abbreviation expression dictionary stored in the abbreviation expression storage unit 14A. In the abbreviation expression dictionary, in a case where any abbreviation expression hits with the word N-gram in the input text, the lattice extension unit 34 executes the following processing. That is, the lattice extension unit 34 adds a node corresponding to an abbreviation expression hit with the word N-gram in the input text to the section corresponding to a word N-gram in the input text of the lattice. By adding a node corresponding to such an abbreviation expression, an extended lattice of the input text is acquired.

The encoder executing unit 36E is a processing unit that executes an RNN encoder.

According to an embodiment, the encoder executing unit 36E expands, on a work area, K LSTMs corresponding to the number K of nodes of an extended lattice, which is extended by the lattice extension unit 34, in accordance with model information on the trained model stored in the model storage unit 12. Thus, K LSTM cells are caused to function as an RNN encoder. For example, the encoder executing unit 36E inputs a word or an abbreviation expression corresponding to the kth node from the beginning of the extended lattice to the LSTM cell corresponding to the kth node in order from the first node of the extended lattice. The encoder executing unit 36E further inputs an output of the LSTM cell corresponding to the (k−1)th node to the LSTM cell corresponding to the kth node. By repeating this input from the LSTM cell corresponding to the first node to the LSTM cell corresponding to the Kth word at the end, vectors, that is, hidden states of the input text are acquired. Thus, the hidden states of the input text generated by the RNN encoder are input to the RNN decoder.

The decoder executing unit 36D is a processing unit that executes an RNN decoder.

According to an embodiment, the decoder executing unit 36D expands, on a work area, N LSTM cells until the EOS tag is output based on model information on a trained model stored in the model storage unit 12. Thus, the L LSTM cells expanded until the EOS tag is output are caused to function as an RNN decoder. For example, the decoder executing unit 36D inputs a hidden state output by the RNN encoder, a BOS tag and the upper limit number of characters to the first LSTM cell. After that, the decoder executing unit 36D executes the following input to the LSTM cell corresponding to the lth element from the beginning of a summary. That is, to the LSTM cell corresponding to the lth element, (l−1)th generated element from the beginning of the summary, the number of remaining characters until the EOS tag is output and a hidden state updated by the LSTM cell corresponding to the (l−1)th element are input. By operating L LSTM cells, the RNN decoder outputs a distribution of generation probabilities of words for each set of L LSTM cells to the generating unit 38. The term "word" here refers to a word that is present in a model dictionary included in the RNN trained model and, for example, is acquired from a word appearing in learning input text in the entire learning samples when the model is trained.

The calculating unit 37 is a processing unit that calculates a generation probability of each node of an extended lattice.

As an example, the kth element from the beginning of a summary, that is, a word in a model dictionary or a word or an abbreviation expression corresponding to a node of an extended lattice is to be generated. In this case, for each set of K nodes included in an extended lattice, the calculating unit 37 calculates, as a score, a similarity such as an inner product of the hidden states output by the LSTM cells of the RNN encoder corresponding to the nodes and a hidden state updated by the kth LSTM cell in the RNN decoder. Then, the calculating unit 37 normalizes the scores of the nodes such that a total of the scores of all nodes is equal to "1". Thus, the normalized scores are acquired as generation probabilities.

The generating unit 38 is a processing unit that generates an element of a summary.

According to an embodiment, the generating unit 38 combines a generation probability of each word in a model dictionary output from the lth LSTM cell of the RNN decoder executed by the decoder executing unit 36D and a generation probability of each node of the extended lattice calculated by the calculating unit 37. For example, the generating unit 38 performs linear combination on a generation probability $p_{vocabulary}$ of each word in the model dictionary and a generation probability $p_{attention}$ of each node of the extended lattice in accordance with the expression (1) to calculate the generation probability p of each element. The generation probability p of an element is calculated by defining the value of the generation probability $p_{vocabulary}$ of a word or abbreviation expressions corresponding to each node of the extended lattice being an unknown word which does not present in the model dictionary as zero. Furthermore, the generation probability p of an element may be calculated by giving a weight discussed in Abigail See, Peter J. Liu, Christopher D. Manning "Get To The Point: Summarization with Pointer-Generator Networks" ACL 2017 to the generation probability $p_{vocabulary}$ of a word and the generation probability $p_{attention}$ of a node of the extended lattice. After that, the generating unit 38 generates an element having the highest generation probability p as the lth word from the beginning of the summary.

Specific Example of Summary Generation

Figure 8:
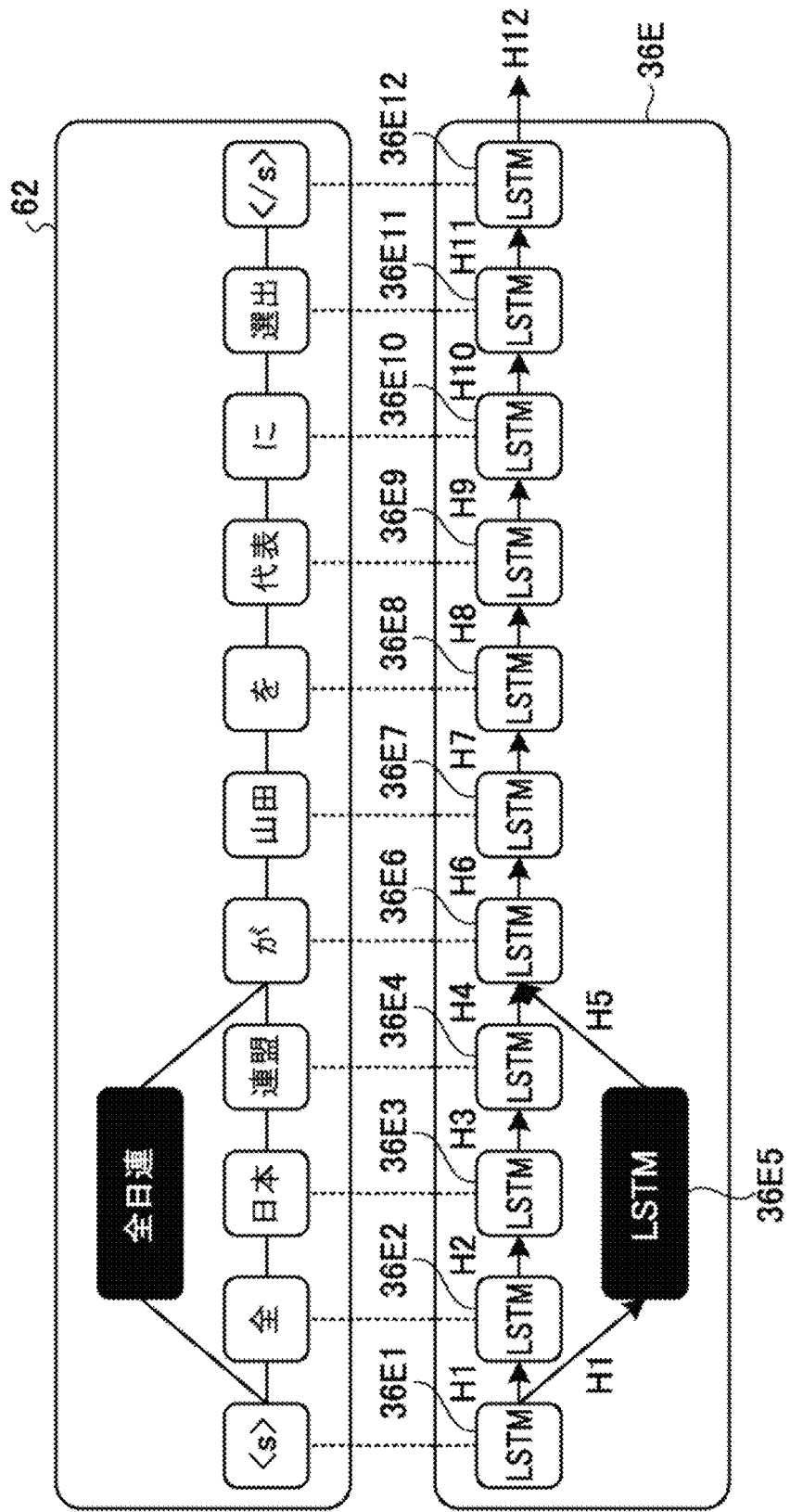
FIG. 8 is a diagram illustrating an example of an extended lattice.
Figure 9:
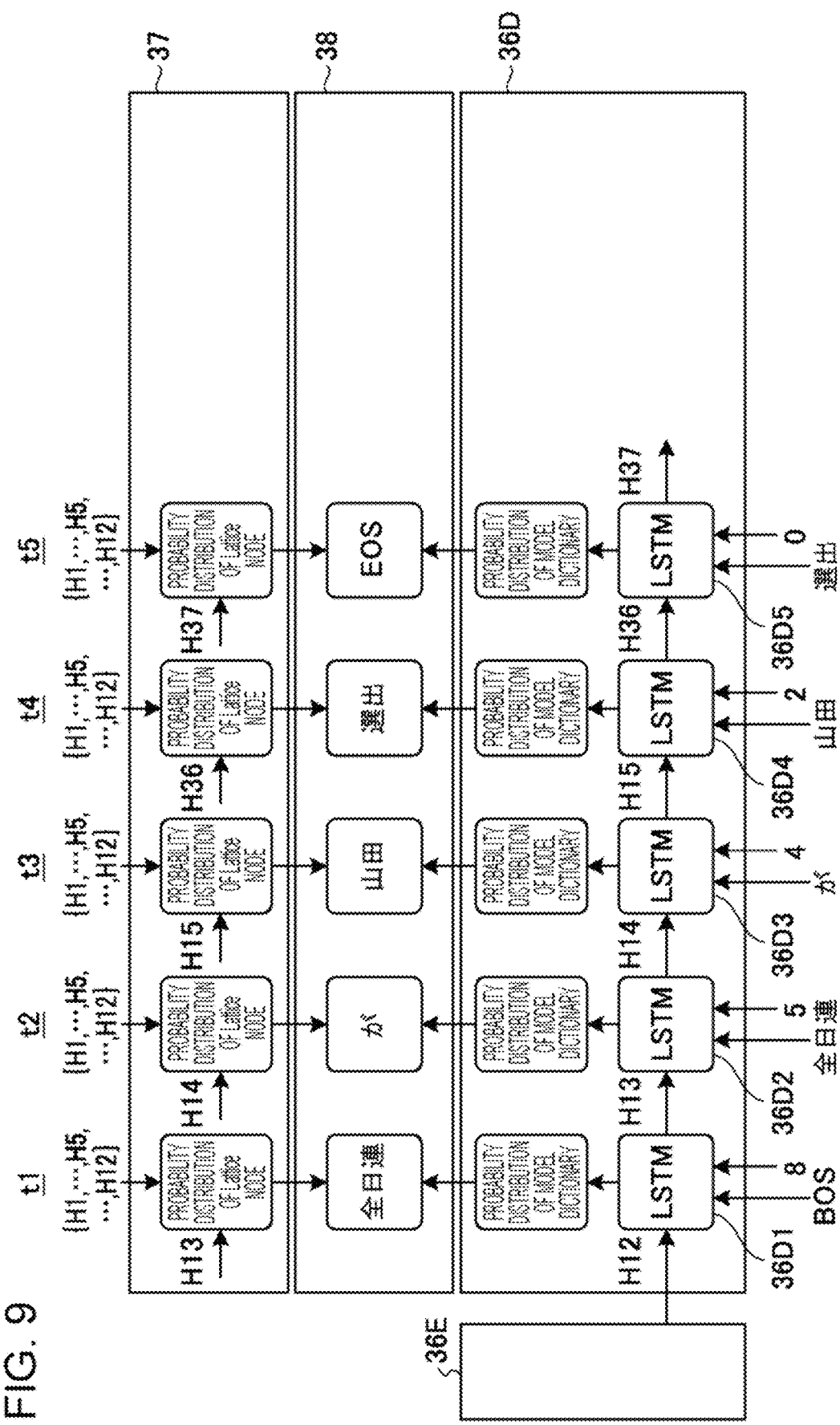
FIG. 9 is a diagram illustrating a case where a summary is generated according to Embodiment 1.

With reference to FIGS. 8 and 9, specific examples of summary generation will be described below. An example in which input text "全日本連盟が山田を代表に選出" similar to the learning input text 40G illustrated in FIG. 3A is input will be described.

FIG. 8 is a diagram illustrating an example of an extended lattice. FIG. 9 is a diagram illustrating a case where a summary is generated according to Embodiment 1.

In a case where input text "全日本連盟が山田を代表に選出" is input, an initial lattice is generated constructed by serially coupling nodes corresponding to the words of the input text "全日本連盟が山田を代表に選出".

In a case where a summary is generated according to this embodiment, the initial lattice is not used for the generation of LSTM cells in the RNN encoder, unlike the technology in the past. In other words, for example, the abbreviation expression "全日連" corresponding to the word trigram "全日本連盟" of input text is retrieved from the abbreviation expression dictionary. Thus, the initial lattice generated from the input text is extended to an extended lattice 62 illustrated in FIG. 8. In other words, for example, as highlighted in FIG. 8, the node corresponding to the abbreviation expression "全日連" hit with the word trigram "全日本連盟" of the input text is added to the section corresponding to the word trigram "全日本連盟" in the input text.

This extended lattice 62 is used for generation of LSTM cells in the RNN encoder. With reference to the example illustrated in FIG. 8, twelve cells of LSTMs 36E1 to 36E12 in the RNN encoder corresponding to the number K (=12) of nodes from the first node "<s>" to the end node "</s>" sequentially in the extended lattice 62 are expanded on a work area. The hidden state is updated and is propagated from LSTM 36E1 to 36E12, and the hidden state H12 is acquired from the RNN encoder.

On the other hand, as illustrated in FIG. 9, as LSTM cells in the RNN decoder, five LSTM cells corresponding to the number L (=5) of elements of the summary up to output of the EOS tag are expanded on a work area. Hereinafter, the LSTM cells expanded on the work area and corresponding to the elements sequentially from the first element of the summary are identified as "LSTM 36D1 to LSTM 36D5".

For example, at the first time t1 when the first element of the summary is generated, the hidden state H12 output from the RNN encoder, the BOS tag, and the number "8" of remaining characters of the summary are input to the first LSTM 36D1 cell of the RNN decoder. As a result, the LSTM 36D1 cell in the RNN decoder calculates the generation probability of each word in the model dictionary to calculate the generation probability $p_{vocabulary}$ of each word at the first time t1 and updates the hidden state H12 to the hidden state H13.

By using the hidden state H13 output by the LSTM 36D1 cell of the RNN decoder, the calculating unit 17 calculates generation probability of a set of twelve nodes included in the extended lattice. For example, the generation probability for the node "全日蓮" in the extended lattice 62 is calculated. In this case, the similarity is calculated as a score between the hidden state H5 output by the LSTM 36E5 cell of the RNN encoder corresponding to the node "全日蓮" of the extended lattice 62 and the hidden state H13 updated by the LSTM 36O1 cell in the RNN decoder. In this manner, scores for all nodes included in the extended lattice 62 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice 62, the generating unit 38 outputs the element "全日蓮" having the highest generation probability p at the first time t1. By subtracting the number "3" of characters for the word "全日蓮" generated at the first time t1 from the initial value "8" of the number of remaining characters, the value of the number of remaining characters is updated to "5".

This processing is repeatedly executed up to the fifth time t5 where the sentence end symbol "EOS" is output from the LSTM 36D5. As a result, according to this embodiment, the summary "全日蓮が中島選出" is acquired. Apparently from the this result, the phrase "全日本連盟" is abbreviated to the abbreviation expression "全日蓮" according to this embodiment. According to this embodiment, a summary including the abbreviation expression "全日蓮" may be generated.

Processing Flow

The following describes the processing flow in the system according to this embodiment. (A) learning processing to be executed by the learning apparatus 10 will be described first, (B) generation processing to be executed by the generating apparatus 30 and (C) lattice extension processing to be executed as a subroutine of the learning processing and the generation processing will then be described.

(A) Learning Processing

Figure 10:
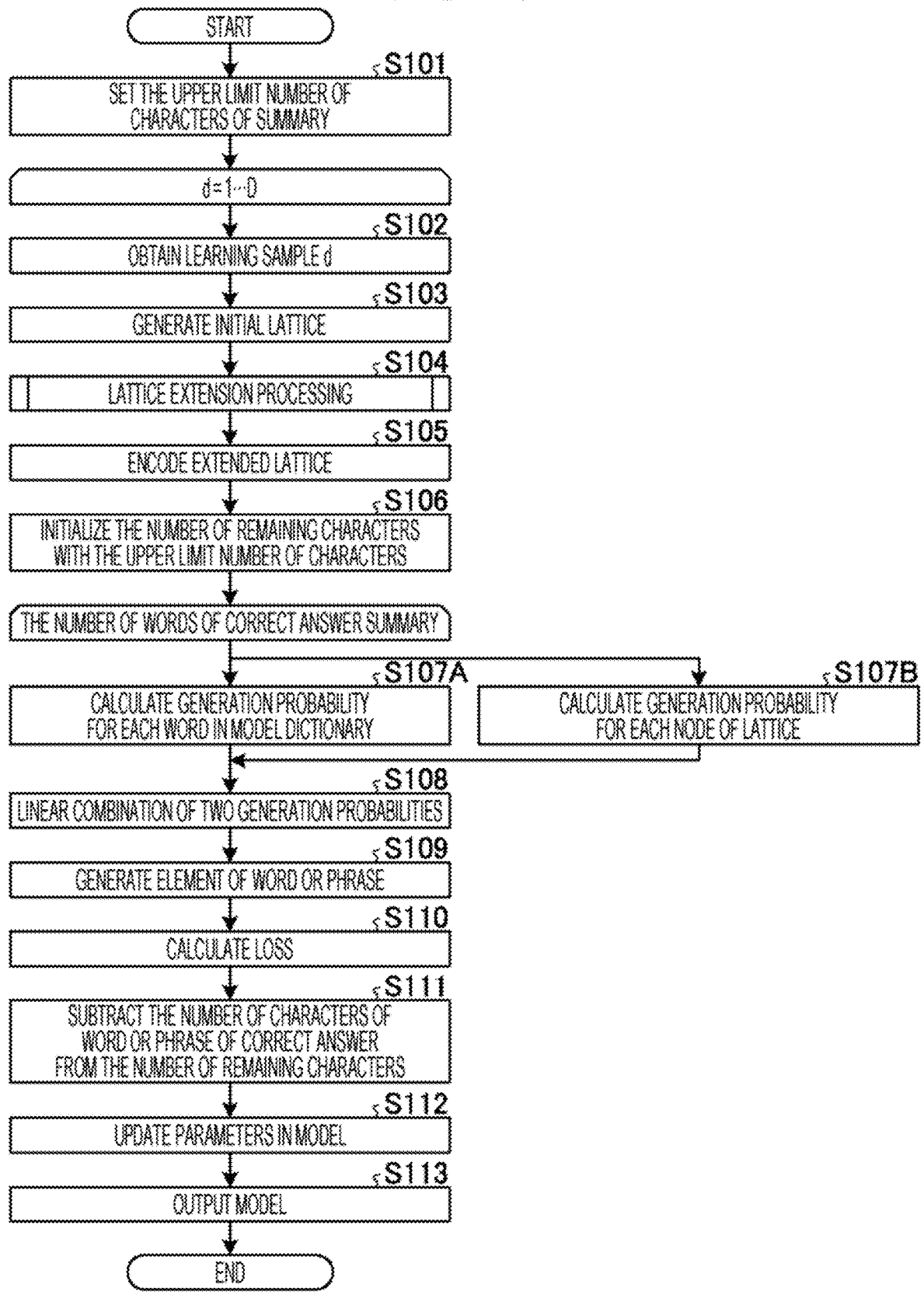
FIG. 10 is a flowchart illustrating the steps of learning processing according to Embodiment 1.

FIG. 10 is a flowchart illustrating the steps of learning processing according to Embodiment 1. As an example, this learning processing is started in response to reception of a request for model learning. As illustrated in FIG. 10, the obtaining unit 13 sets the upper limit number of characters of a summary to be generated by the model (step S101). Then, processing in steps S102 to S112 is executed on each set of D learning samples d included in learning data.

That is, the obtaining unit 13 obtains one learning sample d of learning data stored in the learning data storage unit 11 (step S102). Next, the lattice extension unit 14 generates an initial lattice by serially coupling nodes corresponding to words in learning input text included in a learning sample d obtained in step S102 (step S103).

After that, the lattice extension unit 14 executes "lattice extension processing" that extends the initial lattice generated in step S103 by using the abbreviation expression dictionary and input text included in the learning sample d (step S104).

Next, the encoder executing unit 16E encodes the extended lattice by inputting the extended lattice acquired in step S104 to the RNN encoder in which M LSTM cells corresponding to the number M of nodes of the extended lattice are expanded (step S105). Thus, the vectors, so-called hidden states, of the extended lattice are acquired.

The obtaining unit 13 initializes the value at a register holding the number of remaining characters until the RNN decoder is caused to output an EOS tag to the upper limit number of characters set in step S101 (step S106).

After that, processing in steps S107 to S111 is executed at each time sequentially from the beginning of N words in a correct answer summary.

In other words, for example, the decoder executing unit 16D inputs the number of remaining characters held at the register, the BOS tag or a correct answer word at one previous time and a hidden state output by the LSTM cell corresponding to the one previous time to the LSTM cell corresponding to the current time in the RNN decoder (step S107A). Thus, the generation probability of each word in the model dictionary at the current time is calculated, and the hidden state is updated.

The calculating unit 17 calculates generation probability for each set of M nodes included in the extended lattice based on the hidden state output by the LSTM cells in the RNN encoder corresponding to the nodes and a hidden state updated by the nth LSTM cell in the RNN decoder (step S107B).

The generating unit 18 calculates a generation probability of each element by performing linear combination on a generation probability of each word in the model dictionary and a generation probability of each node in the extended lattice (step S108). The generating unit 18 generates an element having the highest generation probability (step S109).

Then, the updating unit 19 calculates a loss at the current time from the word corresponding to the current time of the words included in the correct answer summary and the element generated in step S109 (step S110).

After that, the obtaining unit 13 subtracts the number of characters of the element generated in step S109 from the number of remaining characters held at the register to update the value of the number of remaining characters at the register (step S111).

Then, when a loss for each set of N words in the correct answer summary is calculated, the updating unit 19 executes log-likelihood optimization based on the loss of each LSTM so that parameters to update the model of the RNN decoder are calculated, and the parameters in the model stored in the model storage unit 12 are updated (step S112).

Then, after the parameters of the model are updated for all of the learning samples d included in learning data, the learning apparatus 10 outputs the trained model to the generating apparatus 30 (step S113), and the processing is ended.

(B) Generation Processing

Figure 11:
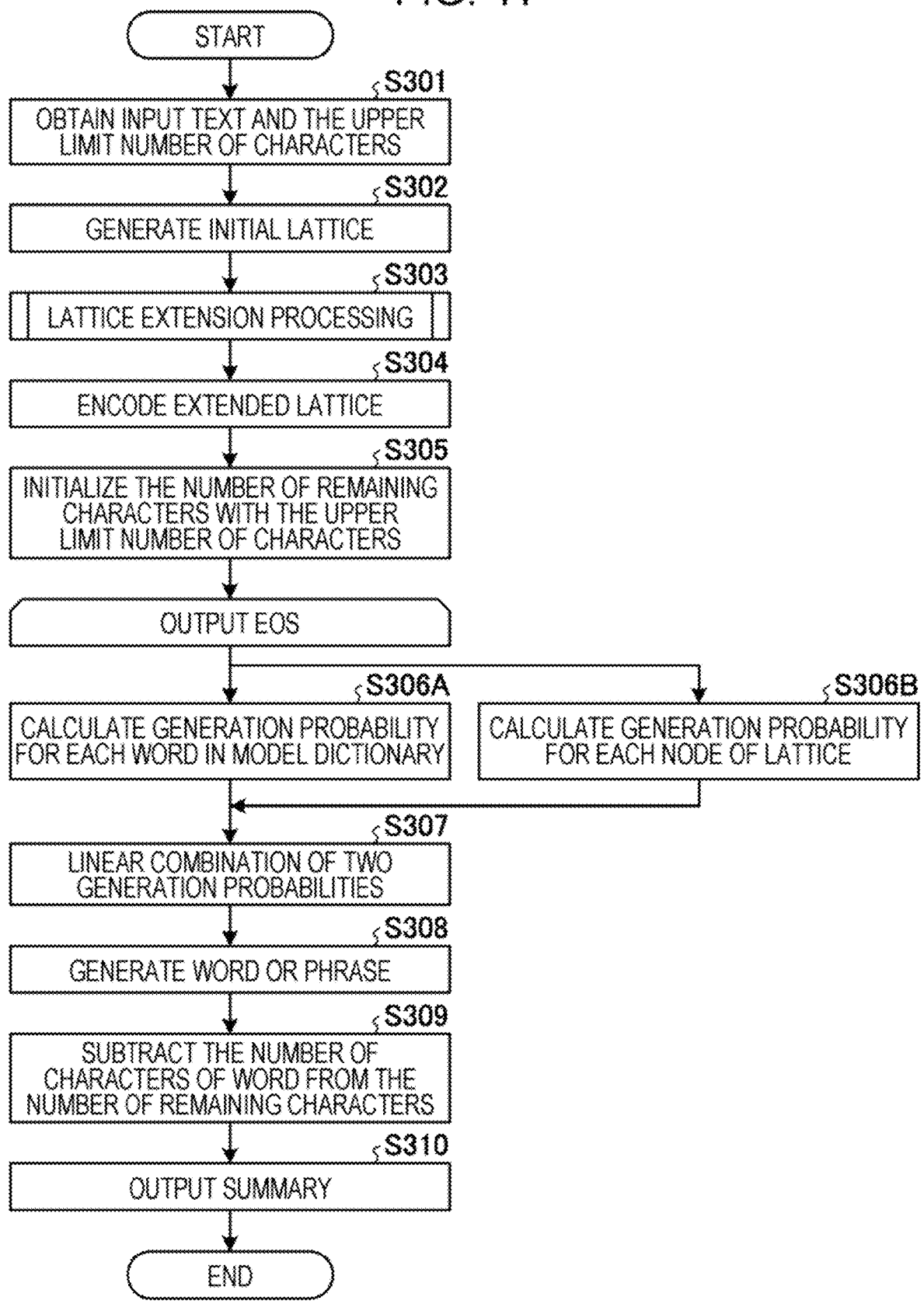
FIG. 11 is a flowchart illustrating the steps of generation processing according to Embodiment 1.

FIG. 11 is a flowchart illustrating the steps of generation processing according to Embodiment 1. As an example, this generation processing is started in response to reception of a request for summary generation. As illustrated in FIG. 11, the obtaining unit 33 obtains input text and a designation of the upper limit number of characters of the summary to be generated by the trained model (steps S301).

Next, the lattice extension unit 34 generates an initial lattice by serially coupling nodes corresponding to words in input text obtained in step S301 (step S302).

After that, the lattice extension unit 34 executes "lattice extension processing" that extends the initial lattice generated in step S302 by using the abbreviation expression dictionary (step S303).

Next, the encoder executing unit 36E encodes the extended lattice by inputting the extended lattice acquired in step S303 to the RNN encoder in which K LSTM cells corresponding to the number K of nodes of the extended lattice are expanded (step S304). Thus, the vectors, so-called hidden states, of the extended lattice are acquired.

The obtaining unit 33 initializes the value at a register holding the number of remaining characters until the RNN decoder is caused to output an EOS tag to the upper limit number of characters obtained in step S301 (step S305).

After that, processing in steps S306 to S309 is executed until the EOS tag is output from the RNN decoder.

In other words, for example, the decoder executing unit 36D inputs the number of remaining characters held at the register, the BOS tag or an element generated at one previous time and a hidden state output by the LSTM cell corresponding to the one previous time to the LSTM cell corresponding to the current time in the RNN decoder (step S306A). Thus, the generation probability of each word in the model dictionary at the current time is calculated, and the hidden state is updated.

The calculating unit 37 calculates generation probability for each set of K nodes included in the extended lattice based on the hidden state output by the LSTM cells in the RNN encoder corresponding to the nodes and a hidden state updated by the lth LSTM cell in the RNN decoder (step S306B).

The generating unit 38 calculates a generation probability of each element by performing linear combination on a generation probability of each word in the model dictionary and a generation probability of each node in the extended lattice (step S307). The generating unit 38 generates an element having the highest generation probability (step S308).

After that, the obtaining unit 33 subtracts the number of characters of the word generated in step S308 from the number of remaining characters held at the register to update the value of the number of remaining characters at the register (step S309).

When an EOS tag is output from the RNN decoder, the generating unit 38 joins elements generated from the first LSTM cell to the Lth LSTM cell to generate a summary and outputs the generated summary to a predetermined output destination (step S310), and the processing is ended.

(C) Lattice Extension Processing

Figure 12:
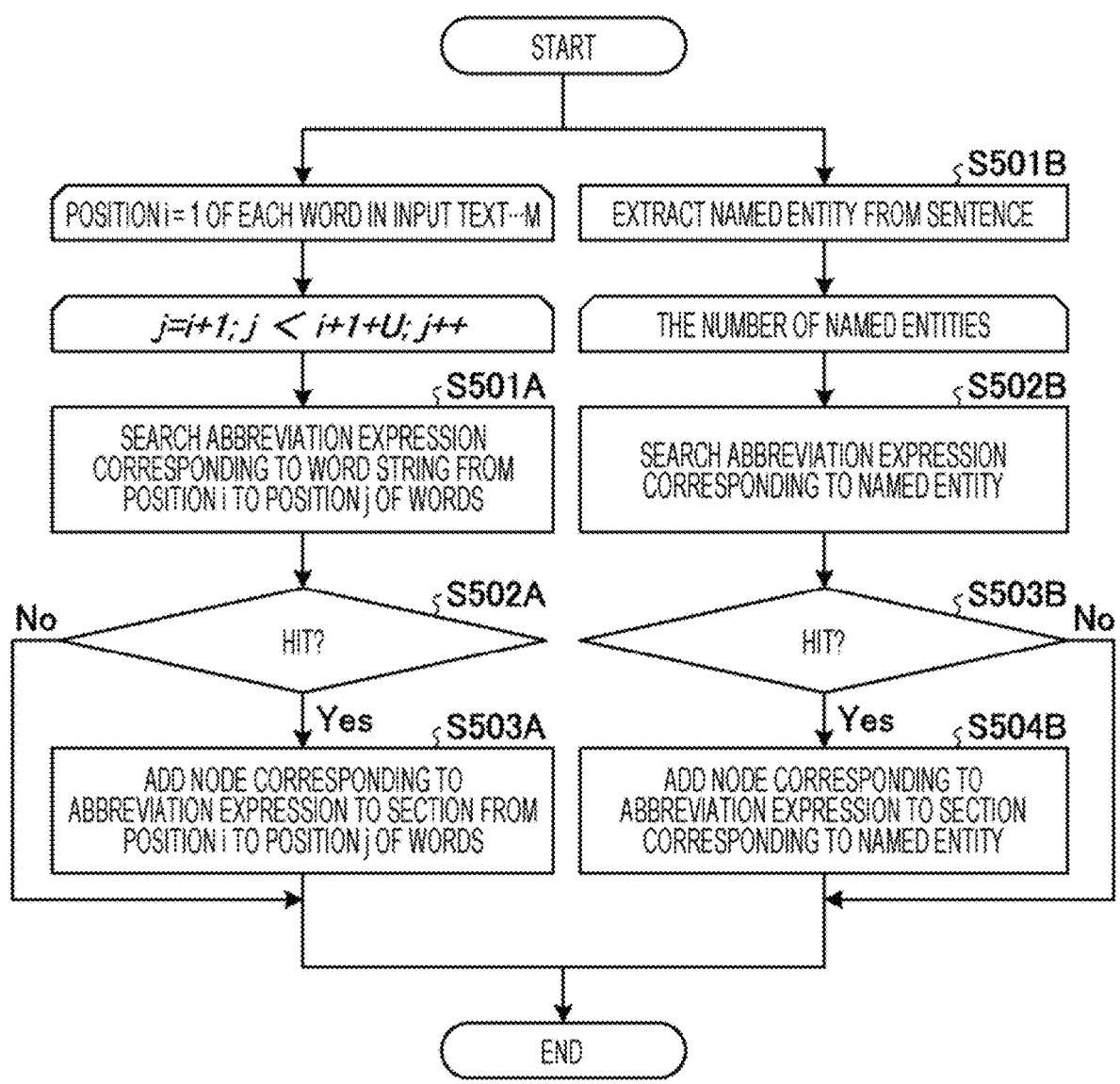
FIG. 12 is a flowchart illustrating the steps of lattice extension processing according to Embodiment 1.

FIG. 12 is a flowchart illustrating the steps of lattice extension processing according to Embodiment 1. This processing corresponds the processing in step S104 illustrated in FIG. 10 and the processing in step S303 illustrated in FIG. 11. Because a correct answer summary is acquired in step S104 illustrated in FIG. 10, the processing from step S501A to step S503A and the processing from step S501B to step S504B is performed. Because a correct answer summary is unknown in step S303 illustrated in FIG. 11, the processing from step S501A to step S503A is performed without performing the processing from step S501B to step S504B.

First, the processing from step S501A to step S503A will be described. As illustrated in FIG. 12, the lattice extension unit 14 or the lattice extension unit 34 repeats the processing from step S501A to step S503A until the variable i designating the beginning position of the word string to be used for searching in the abbreviation expression dictionary is incremented from the beginning position "1" of the learning input text or input text to the end position "M" of the learning input text or the end position "K" of the input text. In this case, the lattice extension unit 14 or the lattice extension unit 34 initializes the value of the variable j designating the end position of a word string to be used for searching in the abbreviation expression dictionary with a value (i+1), and the processing from step S501A to step S503A is repeated until the variable j reaches i+1+U. "U" is the upper limit value of the number of words included in a word string.

Among them, in step S501A, an abbreviation expression corresponding to the word string from the position with the variable i to the position with the variable j of learning input text or input text is searched from the abbreviation expression dictionary. If any abbreviation expression exists that hits with the word string from the position with the variable i to the position with the variable j (Yes in step S502A), the lattice extension unit 14 or the lattice extension unit 34 adds a node corresponding to the abbreviation expression hit with the word string from the position with the variable i to the position with the variable j to the section corresponding to the word string from the position with the variable i to the position with the variable j of the lattice (step S503A).

On the other hand, the processing from step S501B to step S504B will be described. The lattice extension unit 14 extracts a named entity from input text included in a learning sample (step S501B). The processing from step S502B to step S504B is repeated for each named entity extracted from the input text in that way. In other words, for example, the lattice extension unit 14 searches an abbreviation expression corresponding to the named entity from the abbreviation expression dictionary (step S502B). In this case, if an abbreviation expression hits with the named entity (Yes in step S503B), the lattice extension unit 14 adds a node corresponding to the abbreviation expression hit with the named entity to the section corresponding to the named entity of the lattice (step S504B).

One Aspect of Effects

As described above, the learning apparatus 10 and the generating apparatus 30 according to this embodiment extend nodes of a section corresponding to a predetermined expression in a lattice serially coupling nodes corresponding to words in input text and output elements of a summary based on generation probabilities of the nodes of the extended lattice and the generation probabilities of words in a model dictionary. Therefore, with the learning apparatus 10 and the generating apparatus 30 according to this embodiment, the failure of omission of a phrase included in input text may be suppressed.

Embodiment 2

Heretofore, the embodiments of the apparatus of the present disclosure have been described. It is to be understood that embodiments may be made in various ways other than the aforementioned embodiments. Therefore, other embodiments are described below.

Application Example 1 of Extension Method

Having described the example that a node corresponding to an abbreviation expression hit with a word N-gram of learning input text or input text is added for lattice extension according to Embodiment 1, the node to be added for lattice extension may not be a node corresponding to an abbreviation expression. For example, the lattice extension unit 14 or the lattice extension unit 34 may add a node corresponding to each of characters included in a word N-gram of learning input text or input text if an abbreviation expression corresponding to the word N-gram of the learning input text or input text hits.

Figure 13:
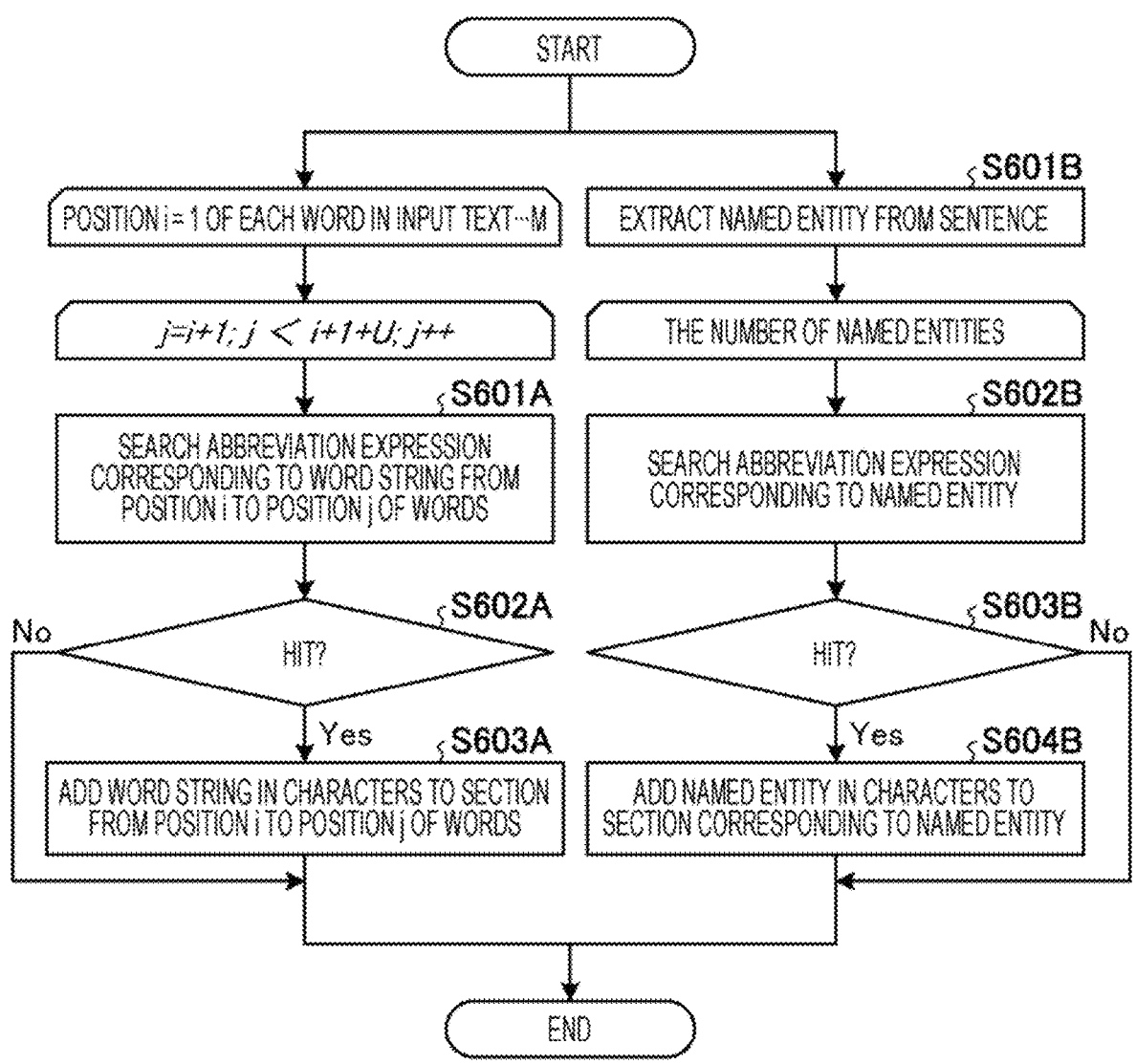
FIG. 13 is a flowchart illustrating the steps of lattice extension processing according to Application Example 1.

When this extension method is applied, the lattice extension processing illustrated in FIG. 12 may be replaced by the lattice extension processing illustrated in FIG. 13 so that the failure in omission of a phrase included in input text may be suppressed like Embodiment 1.

FIG. 13 is a flowchart illustrating the steps of lattice extension processing according to Application Example 1. This processing corresponds the processing in step S104 illustrated in FIG. 10 and the processing in step S303 illustrated in FIG. 11. Because a correct answer summary is acquired in step S104 illustrated in FIG. 10, the processing from step S601A to step S603A and the processing from step S601B to step S604B is performed. On the other hand, because a correct answer summary is unknown in step S303 illustrated in FIG. 11, the processing from step S601A to step S603A is performed without performing the processing from step S601B to step S604B.

First, the processing from step S601A to step S603A will be described. As illustrated in FIG. 13, the lattice extension unit 14 or the lattice extension unit 34 repeats the processing from step S601A to step S603A until the variable i designating the beginning position of the word string to be used for searching in the abbreviation expression dictionary is incremented from the beginning position "1" of the learning input text or input text to the end position "M" of the learning input text or the end position "K" of the input text. In this case, the lattice extension unit 14 or the lattice extension unit 34 initializes the value of the variable j designating the end position of a word string to be used for searching in the abbreviation expression dictionary with a value (i+1), and the processing from step S601A to step S603A is repeated until the variable j reaches i+1+U. "U" is the upper limit value of the number of words included in a word string.

Among them, in step S601A, an abbreviation expression corresponding to the word string from the position with the variable i to the position with the variable j of learning input text or input text is searched from the abbreviation expression dictionary. If any abbreviation expression exists that hits with the word string from the position with the variable i to the position with the variable j (Yes in step S602A), the lattice extension unit 14 or the lattice extension unit 34 adds a node corresponding to each character included in the word string from the position with the variable i to the position with the variable j to the section corresponding to the word string from the position with the variable i to the position with the variable j of the lattice (step S603A).

On the other hand, the processing from step S601B to step S604B will be described. The lattice extension unit 14 extracts a named entity from input text included in a learning sample (step S601B). The processing from step S602B to step S604B is repeated for each named entity extracted from the input text in that way. In other words, for example, the lattice extension unit 14 searches an abbreviation expression corresponding to the named entity from the abbreviation expression dictionary (step S602B). In this case, if an abbreviation expression hits with the named entity (Yes in step S603B), the lattice extension unit 14 adds a node corresponding to each character included in the named entity to the section corresponding to the named entity of the lattice (step S604B).

(1) Specific Example of Model Learning

A case of generation of a summary according to Application Example 1 will be described by describing specific examples of model learning below with reference to FIGS. 14 and 15. In this case, the example used in the learning sample illustrated in FIG. 3A and FIG. 3B will be described as an example of a learning sample.

Figure 14:
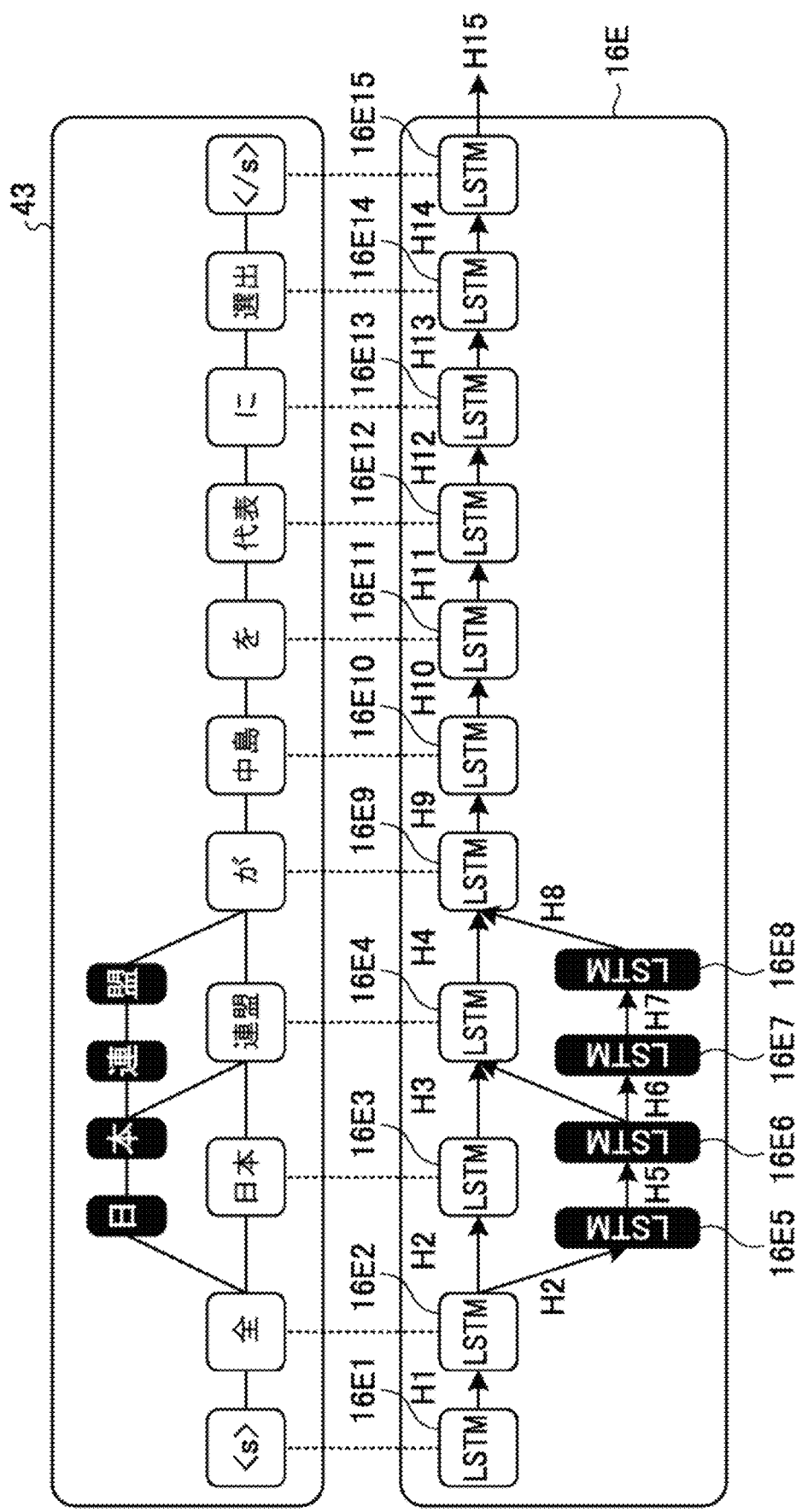
FIG. 14 is a diagram illustrating an example of an extended lattice.

FIG. 14 is a diagram illustrating an example of an extended lattice. FIG. 15 is a diagram illustrating a case where a summary is generated according to Application Example 1.

In a case where learning input text 40G illustrated in FIG. 3A is input, an initial lattice 41 is generated in which nodes corresponding to the words in the learning input text 40G are serially coupled, as illustrated in FIG. 4.

Also in Application Example 1, the initial lattice 41 is not used for the generation of LSTM cells in the RNN encoder, unlike the technology in the past. In other words, for example, the abbreviation expression "全日連" corresponding to the word trigram "全日本連盟" in the learning input text 40G is retrieved from the abbreviation expression dictionary. Thus, the initial lattice 41 illustrated in FIG. 4 is extended to the extended lattice 43 illustrated in FIG. 14. In other words, for example, as highlighted in FIG. 14, the nodes corresponding to each character "全", "日", "本", "連", "盟" included in the word trigram "全日本連盟" of the learning input text 40G are added to the section corresponding to the word trigram "全日本連盟" in the learning input text 40G.

This extended lattice 43 is used for generation of LSTM cells in the RNN encoder. With reference to the example illustrated in FIG. 14, 15 cells of LSTMs 16E1 to 16E15 in the RNN encoder corresponding to the number M (=15) of nodes from the first node "<s>" to the end node "</s>" sequentially in the extended lattice 43 are expanded on a work area. The hidden state is updated and is propagated from LSTM 16E1 to 16E15, and the hidden state H15 is acquired from the RNN encoder.

Figure 15:
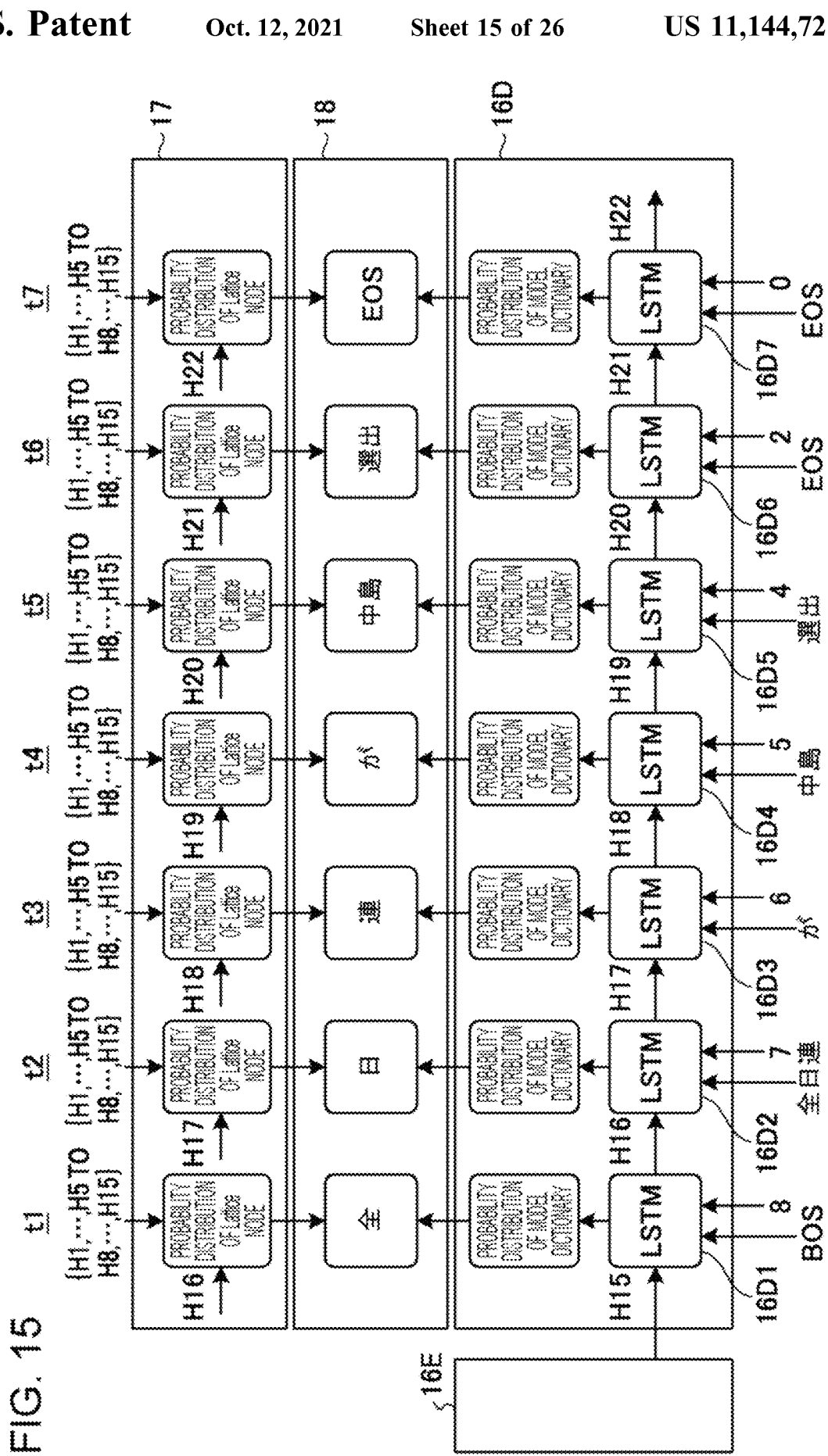
FIG. 15 is a diagram illustrating a case where a summary is generated according to Application Example 1.

On the other hand, as illustrated in FIG. 15, seven LSTM cells in the RNN decoder are expanded on the work area which corresponds to the number N(=7) of words included in a correct answer summary 40Y illustrated in FIG. 3B. Hereinafter, LSTM cells expanded on the work area, which correspond to words in order from the first word in the correct answer summary 40Y, are identified as "LSTM 16D1 to LSTM 16D7".

For example, at the first time t1 when the first element of the summary is generated, the hidden state H15 output from the RNN encoder, the BOS tag, and the number of remaining characters of the summary such as the number "8" of characters of the correct answer summary 40Y are input to the first LSTM 16D1 cell of the RNN decoder. As a result, the LSTM 16D1 cell in the RNN decoder calculates the generation probability of each word in the model dictionary to calculate the generation probability $p_{vocabulary}$ of each word at the first time t1 and updates the hidden state H15 to the hidden state H16.

By using the hidden state H16 output by the LSTM 16D1 cell of the RNN decoder, the calculating unit 17 calculates generation probability of a set of nodes included in the extended lattice 43. For example, the generation probability for the node "日" in the extended lattice 43 is calculated. In this case, the similarity is calculated as a score between the hidden state H5 output by the LSTM 16E5 cell of the RNN encoder corresponding to the node "日" of the extended lattice 43 and the hidden state H16 updated by the LSTM 16D1 cell in the RNN decoder. The generation probability for the node "連" in the extended lattice 43 is calculated, for example. In this case, the similarity is calculated as a score between the hidden state H7 output by the LSTM 16E7 cell of the RNN encoder corresponding to the node "連" of the extended lattice 43 and the hidden state H16 updated by the LSTM 16D1 cell in the RNN decoder. In this manner, scores for all nodes included in the extended lattice 43 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element "全" having the highest generation probability p at the first time t1. By subtracting the number "1" of characters for the word "全" generated at the first time t1 from the initial value "8" of the number of remaining characters, the value of the number of remaining characters is updated to "7".

Next, at the second time t2 when the first element of the summary is generated, the hidden state H16 output from the RNN encoder, the correct answer word "全日連" at the first time t1 and the number "7" of remaining characters of the summary are input to the first LSTM 16D2 cell of the RNN decoder. As a result, the LSTM 16D2 cell in the RNN decoder calculates the generation probability of each word in the model dictionary to calculate the generation probability $p_{vocabulary}$ of each word at the second time t2 and updates the hidden state H16 to the hidden state H17.

By using the hidden state H17 output by the LSTM 16D2 cell of the RNN decoder, the calculating unit 17 calculates generation probability of a set of nodes included in the extended lattice 43. For example, the generation probability for the node "日" in the extended lattice 43 is calculated. In this case, the similarity is calculated as a score between the hidden state H5 output by the LSTM 16E5 cell of the RNN encoder corresponding to the node "日" of the extended lattice 43 and the hidden state H17 updated by the LSTM 16D2 cell in the RNN decoder. The generation probability for the node "連" in the extended lattice 43 is calculated, for example. In this case, the similarity is calculated as a score between the hidden state H7 output by the LSTM 16E7 cell of the RNN encoder corresponding to the node "連" of the extended lattice 43 and the hidden state H17 updated by the LSTM 16D2 cell in the RNN decoder. In this manner, scores for all nodes included in the extended lattice 43 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element "日" having the highest generation probability p at the second time t2. By subtracting the number "1" of characters for the word "日" generated at the second time t2 from of the number "7" of remaining characters, the value of the number of remaining characters is updated to "6".

Next, at the third time t3 when the first element of the summary is generated, the hidden state H17 output from the RNN encoder, the correct answer word "が" at the second time t2 and the number "6" of remaining characters of the summary are input to the first LSTM 16D3 cell of the RNN decoder. As a result, the LSTM 16D3 cell in the RNN decoder calculates the generation probability of each word in the model dictionary to calculate the generation probability $p_{vocabulary}$ of each word at the third time t3 and updates the hidden state H17 to the hidden state H18.

By using the hidden state H18 output by the LSTM 16D3 cell of the RNN decoder, the calculating unit 17 calculates generation probability of a set of nodes included in the extended lattice 43. For example, the generation probability for the node "日" in the extended lattice 43 is calculated. In this case, the similarity is calculated as a score between the hidden state H5 output by the LSTM 16E5 cell of the RNN encoder corresponding to the node "日" of the extended lattice 43 and the hidden state H18 updated by the LSTM 16D3 cell in the RNN decoder. The generation probability for the node "連" in the extended lattice 43 is calculated, for example. In this case, the similarity is calculated as a score between the hidden state H7 output by the LSTM 16E7 cell of the RNN encoder corresponding to the node "連" of the extended lattice 43 and the hidden state H18 updated by the LSTM 16D3 cell in the RNN decoder. In this manner, scores for all nodes included in the extended lattice 43 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element "連" having the highest generation probability p at the third time t3. By subtracting the number "1" of characters for the word "連" generated at the third time t3 from of the number "6" of remaining characters, the value of the number of remaining characters is updated to "5".

This processing is repeatedly executed up to the seventh time t7 where the sentence end symbol "EOS" is output from the LSTM 16D7. As a result, also according to Application Example 1, the summary "全日連が中島選出" is acquired. Apparently from the comparison between this result and the correct answer summary 40Y, the phrase "全日本連盟" is abbreviated to the abbreviation expression "全日連" in Application Example 1. According to Application Example 1, a summary including the abbreviation expression "全日連" may be generated.

(2) Specific Example of Summary Generation

Figure 16:
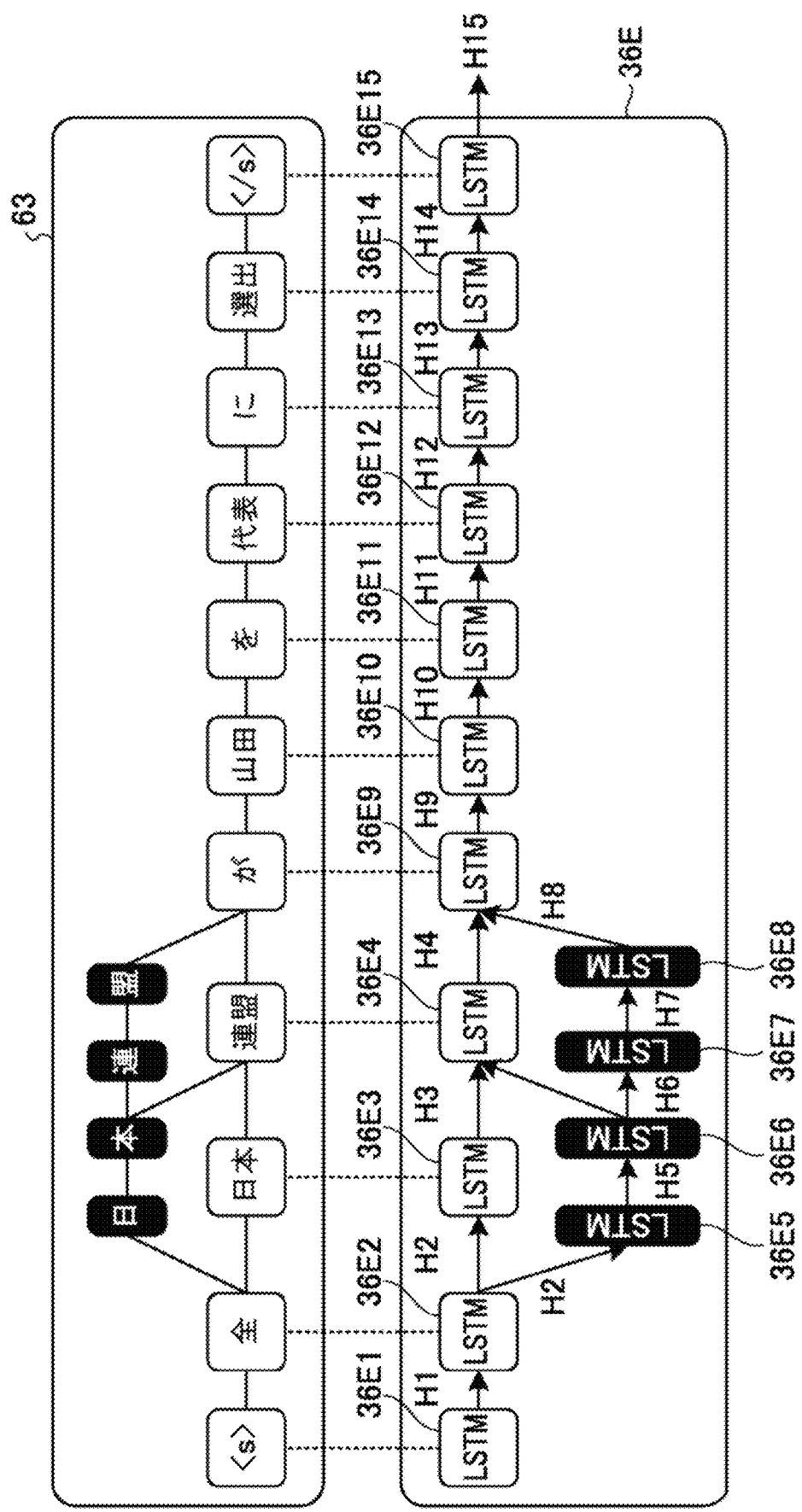
FIG. 16 is a diagram illustrating an example of an extended lattice.
Figure 17:
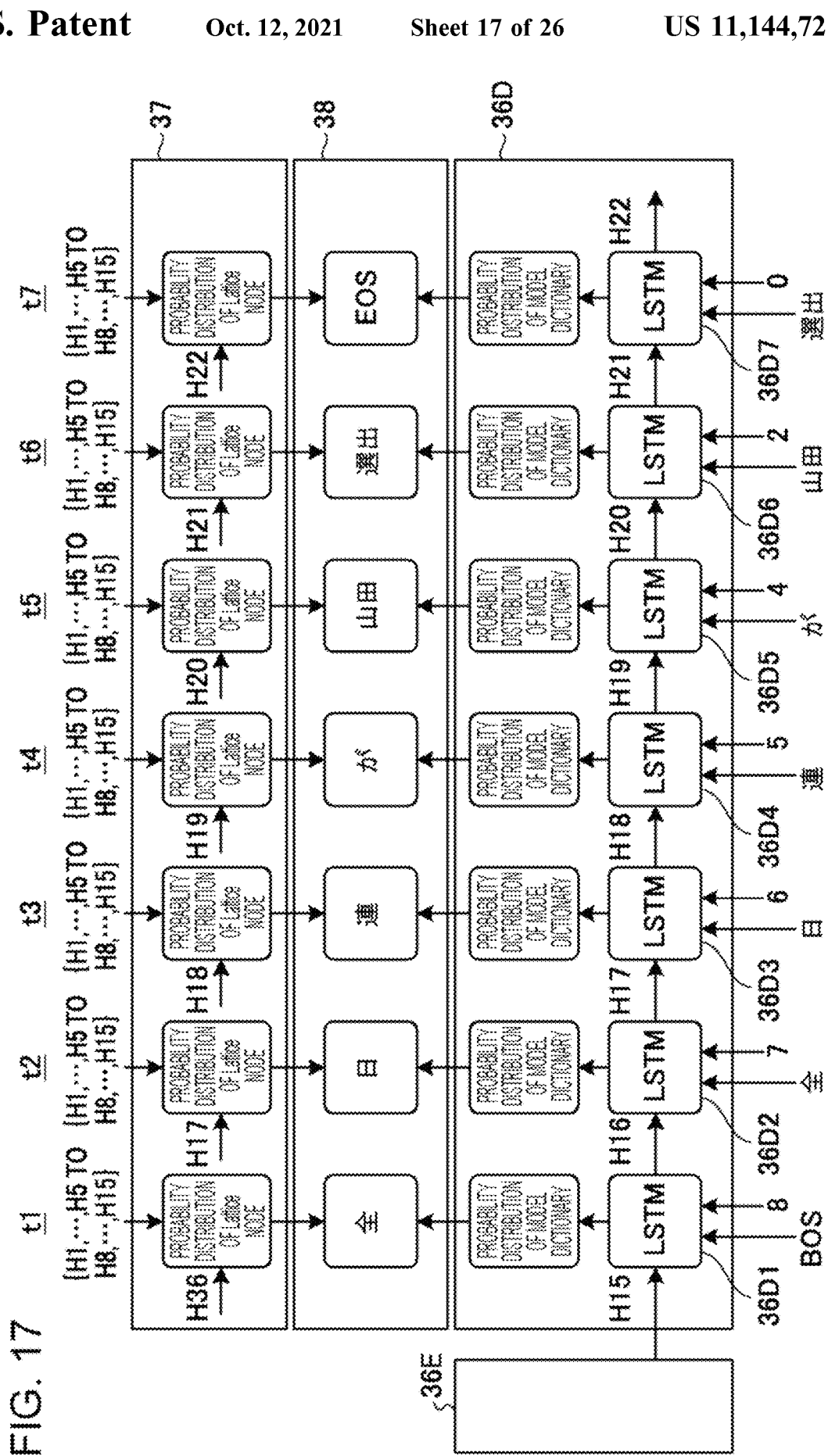
FIG. 17 is a diagram illustrating a case where a summary is generated according to Application Example 1.

With reference to FIGS. 16 and 17, specific examples of summary generation will be described below. An example in which input text "全日本連盟が山 田を代表に選出" similar to the learning input text 40G illustrated in FIG. 3A is input will be described.

FIG. 16 is a diagram illustrating an example of an extended lattice. FIG. 17 is a diagram illustrating a case where a summary is generated according to Application Example 1.

In a case where input text "全日本連盟が山 田を代表に選出" is input, an initial lattice is generated constructed by serially coupling nodes corresponding to the words of the input text "全日本連盟が山 田を代表に選出".

In a case where a summary is generated according to Application Example 1, the initial lattice is not used for the generation of LSTM cells in the RNN encoder, unlike the technology in the past. In other words, for example, the abbreviation expression "全日連" corresponding to the word trigram "全日本連盟" of input text is retrieved from the abbreviation expression dictionary. Thus, the initial lattice generated from the input text is extended to an extended lattice 63 illustrated in FIG. 16. In other words, for example, as highlighted in FIG. 16, the nodes corresponding to each character "全", "日", "本", "連", "盟" included in the word trigram "全日本連盟" of the input text are added to the section corresponding to the word trigram "全日本連盟" in the input text.

This extended lattice 63 is used for generation of LSTM cells in the RNN encoder. With reference to the example illustrated in FIG. 16, 15 cells of LSTMs 36E1 to 36E15 in the RNN encoder corresponding to the number M (=15) of nodes from the first node "<s>" to the end node "</s>" sequentially in the extended lattice 63 are expanded on a work area. The hidden state is updated and is propagated from LSTM 36E1 to 36E15, and the hidden state H15 is acquired from the RNN encoder.

On the other hand, as illustrated in FIG. 17, as LSTM cells in the RNN decoder, seven LSTM cells corresponding to the number L (=7) of elements of the summary up to output of the EOS tag are expanded on a work area. Hereinafter, the LSTM cells expanded on the work area and corresponding to the words sequentially from the first element of the summary are identified as "LSTM 36D1 to LSTM 36D7".

For example, at the first time t1 when the first element of the summary is generated, the hidden state H15 output from the RNN encoder, the BOS tag, and the number "8" of remaining characters of the summary are input to the first LSTM 36D1 cell of the RNN decoder. As a result, the LSTM 36D1 cell in the RNN decoder calculates the generation probability of each word in the model dictionary to calculate the generation probability $p_{vocabulary}$ of each word at the first time t1 and updates the hidden state H15 to the hidden state H16.

By using the hidden state H16 output by the LSTM 36D1 cell of the RNN decoder, the calculating unit 37 calculates generation probability of a set of nodes included in the extended lattice 63. For example, the generation probability for the node "日" in the extended lattice 63 is calculated. In this case, the similarity is calculated as a score between the hidden state H5 output by the LSTM 36E5 cell of the RNN encoder corresponding to the node "日" of the extended lattice 63 and the hidden state H16 updated by the LSTM 36D1 cell in the RNN decoder. The generation probability for the node "連" in the extended lattice 63 is calculated, for example. In this case, the similarity is calculated as a score between the hidden state H7 output by the LSTM 36E7 cell of the RNN encoder corresponding to the node "連" of the extended lattice 63 and the hidden state H16 updated by the LSTM 36D1 cell in the RNN decoder. In this manner, scores for all nodes included in the extended lattice 63 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 38 outputs the element "全" having the highest generation probability p at the first time t1. By subtracting the number "1" of characters for the word "全" generated at the first time t1 from the initial value "8" of the number of remaining characters, the value of number of remaining characters is updated to "7".

Next, at the second time t2 when the first element of the summary is generated, the hidden state H16 updated at the first time t1, the element "全" generated at the first time t1 and the number "7" of remaining characters are input to the first LSTM 36D2 cell of the RNN decoder. As a result, the LSTM 36D2 cell in the RNN decoder calculates the generation probability of each word in the model dictionary to calculate the generation probability $p_{vocabulary}$ of each word at the second time t2 and updates the hidden state H16 to the hidden state H17.

By using the hidden state H17 output by the LSTM 36D2 cell of the RNN decoder, the calculating unit 37 calculates generation probability of a set of nodes included in the extended lattice 63. For example, the generation probability for the node "日" in the extended lattice 63 is calculated. In this case, the similarity is calculated as a score between the hidden state H5 output by the LSTM 36E5 cell of the RNN encoder corresponding to the node "日" of the extended lattice 63 and the hidden state H17 updated by the LSTM 3602 cell in the RNN decoder. The generation probability for the node "連" in the extended lattice 63 is calculated, for example. In this case, the similarity is calculated as a score between the hidden state H7 output by the LSTM 36E7 cell of the RNN encoder corresponding to the node "連" of the extended lattice 63 and the hidden state H17 updated by the LSTM 36D2 cell in the RNN decoder. In this manner, scores for all nodes included in the extended lattice 63 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 38 outputs the element "日" having the highest generation probability p at the second time U2. By subtracting the number "1" of characters for the word "日" generated at the second time t2 from of the number "7" of remaining characters, the value of the number of remaining characters is updated to "6".

Next, at the third time t3 when the first element of the summary is generated, the hidden state H17 updated at the second time t2, the element "日" generated at the second time t2 and the number "6" of remaining characters are input to the first LSTM 36D3 cell of the RNN decoder. As a result, the LSTM 36D3 cell in the RNN decoder calculates the generation probability of each word in the model dictionary to calculate the generation probability $p_{vocabulary}$ of each word at the third time t3 and updates the hidden state H17 to the hidden state H18.

By using the hidden state H18 output by the LSTM 36D3 cell of the RNN decoder, the calculating unit 37 calculates generation probability of a set of nodes included in the extended lattice 63. For example, the generation probability for the node "日" in the extended lattice 63 is calculated. In this case, the similarity is calculated as a score between the hidden state H5 output by the LSTM 36E5 cell of the RNN encoder corresponding to the node "日" of the extended lattice 63 and the hidden state H18 updated by the LSTM 36D3 cell in the RNN decoder. The generation probability for the node "連" in the extended lattice 63 is calculated, for example. In this case, the similarity is calculated as a score between the hidden state H7 output by the LSTM 36E7 cell of the RNN encoder corresponding to the node "連" of the extended lattice 63 and the hidden state H18 updated by the LSTM 36D3 cell in the RNN decoder. In this manner, scores for all nodes included in the extended lattice 63 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 38 outputs the element "連" having the highest generation probability p at the third time t3. By subtracting the number "1" of characters for the word "連" generated at the third time t3 from of the number "6" of remaining characters, the value of the number of remaining characters is updated to "5".

This processing is repeatedly executed up to the seventh time t7 where the sentence end symbol "EOS" is output from the LSTM 16D7. As a result, also according to Application Example 1, the summary "全日連が山田退出" is acquired. Apparently from the this result, the phrase "全日本連盟" is abbreviated to the abbreviation expression "全日連" according to an Application Example 1. According to Application Example 1, a summary including the abbreviation expression "全日連" may be generated.

Application Example 2 of Extension Method

Having described that, according to Embodiment 1, an abbreviation expression corresponding to the word N-gram in learning input text or input text hits as an example of a condition for extending a lattice, the condition is not limited thereto. For example, the lattice extension unit 14 or the lattice extension unit 34 may add a node corresponding to a named entity included in learning input text or input text if the named entity is included in the learning input text or input text.

Figure 18:
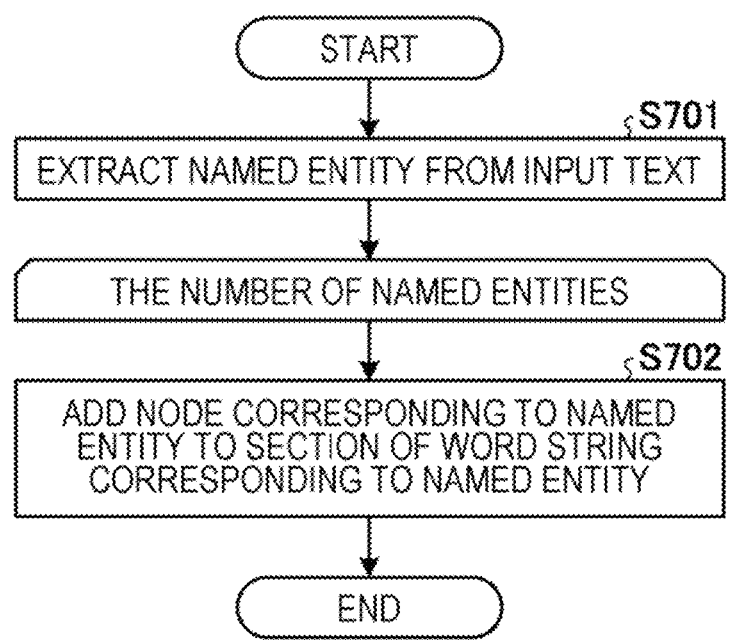
FIG. 18 is a flowchart illustrating the steps of lattice extension processing according to Application Example 2.

When this extension method is applied, the lattice extension processing illustrated in FIG. 12 may be replaced by the lattice extension processing illustrated in FIG. 18 so that generation of a summary having a disconnected part of a named entity included in input text may be suppressed.

FIG. 18 is a flowchart illustrating the steps of lattice extension processing according to Application Example 2. This processing corresponds the processing in step S104 illustrated in FIG. 10 and the processing in step S303 illustrated in FIG. 11.

As illustrated in FIG. 18, the lattice extension unit 14 or the lattice extension unit 34 extracts a named entity from learning input text or input text (step S701). The processing in step S702 is repeated for each named entity extracted from the input text in that way. The term, "named entity" here preferably refers to a named entity in the entire section where a series of the label "Y" corresponding to the named entity is provided. In other words, for example, the lattice extension unit 14 or the lattice extension unit 34 adds a node corresponding to the named entity to the section corresponding to the named entity extracted in step S701 in the lattice of learning input text or input text (step S702).

(1) Specific Example of Model Learning

Cases of generation of a summary in a technology in the past and in Application Example 2 will be compared by describing specific examples of model learning below with reference to FIGS. 19A to 23.

Figures 19A, 19B:
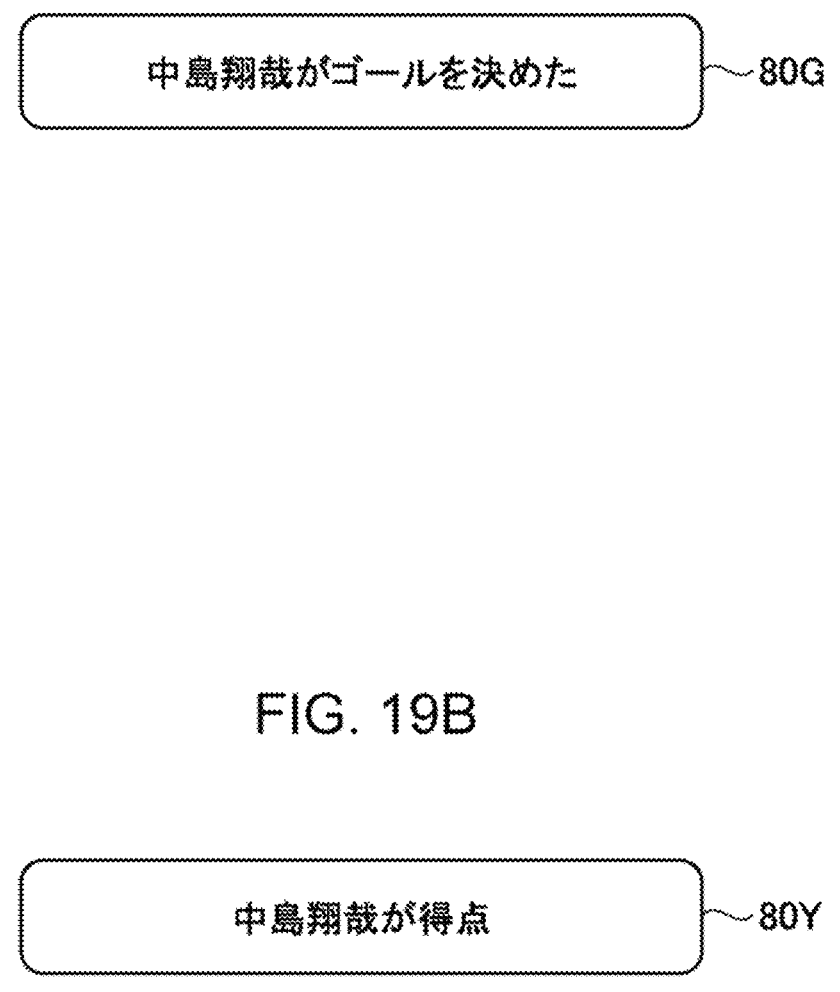
Figure 20:
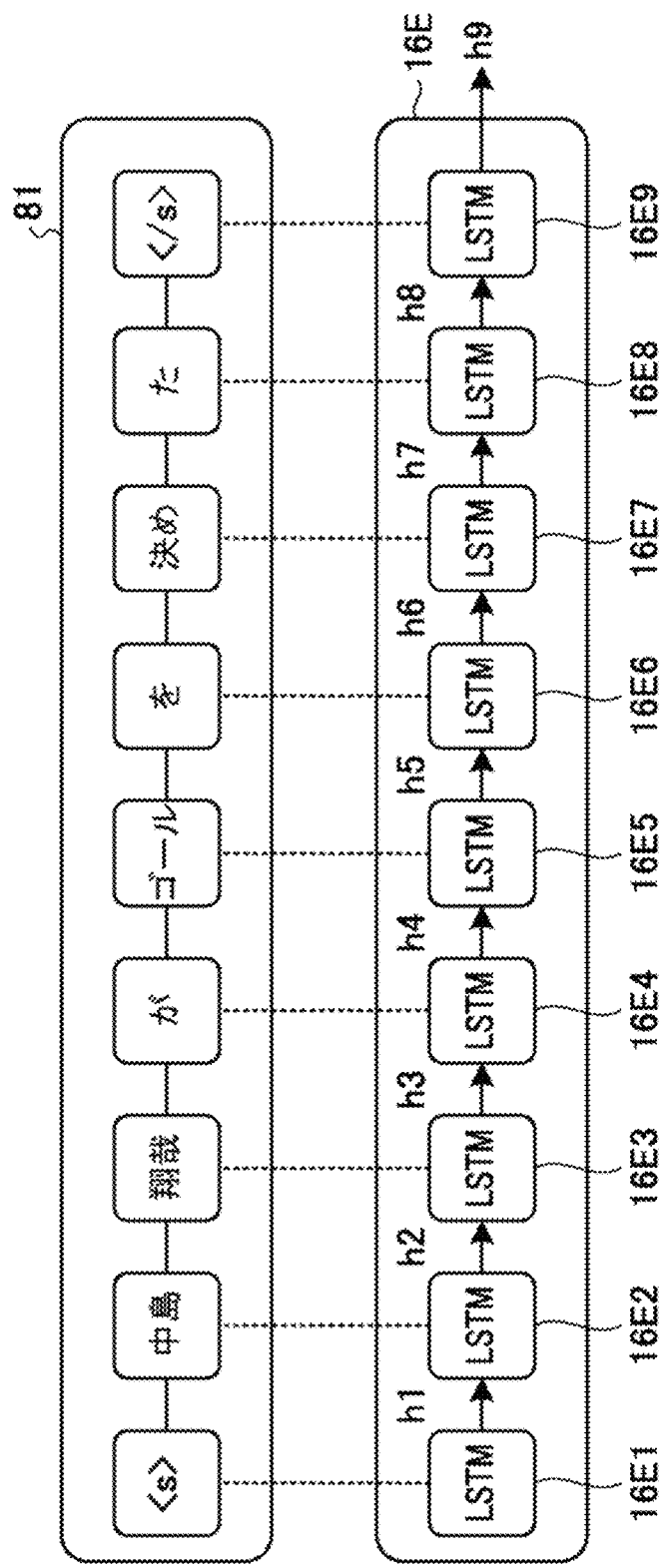
FIG. 20 is a diagram illustrating an example of an initial lattice.
Figure 21:
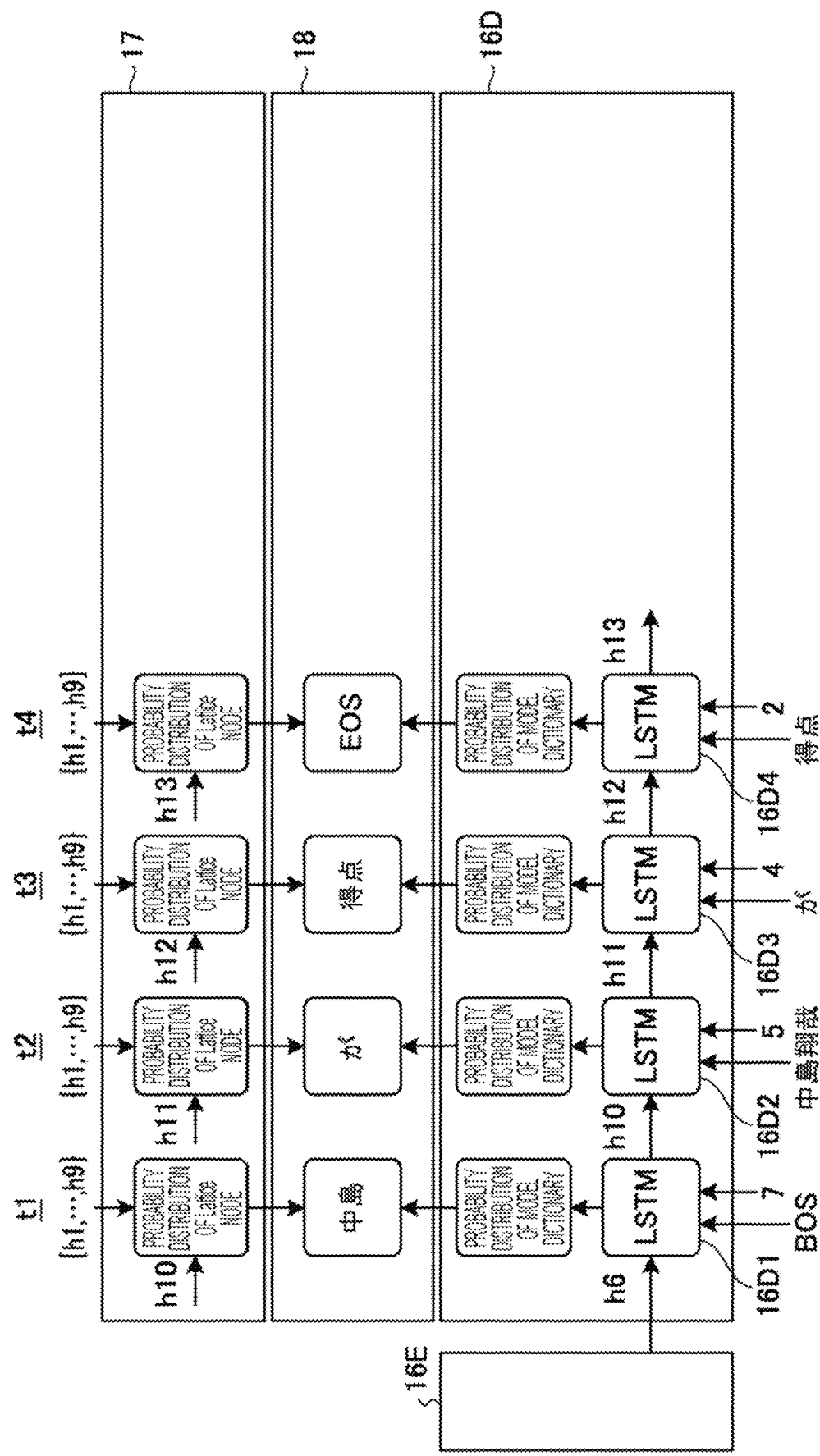
FIG. 21 is a diagram illustrating a case where a summary is generated according to a technology in the past.
Figure 22:
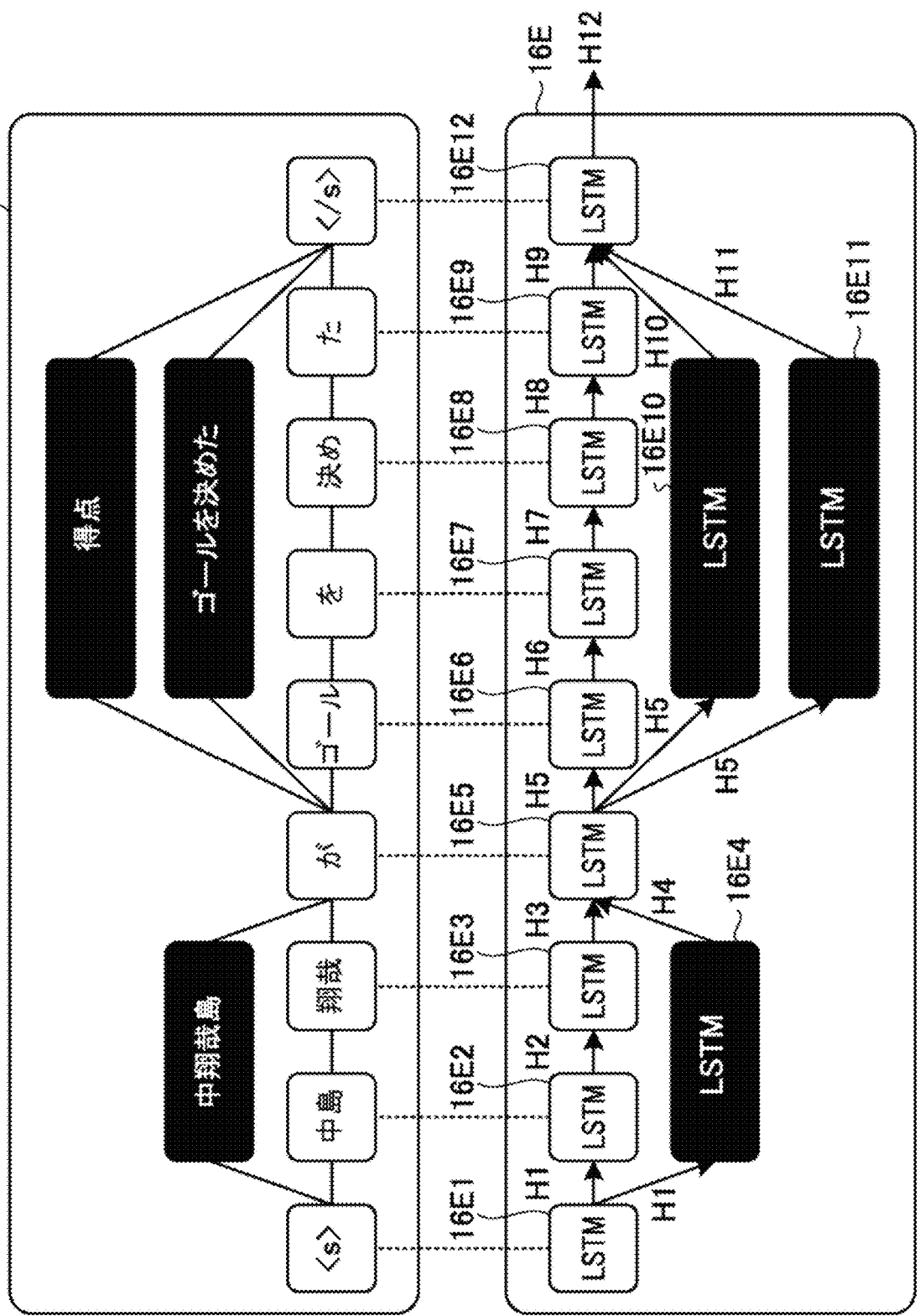
FIG. 22 is a diagram illustrating an example of an extended lattice.
Figure 23:
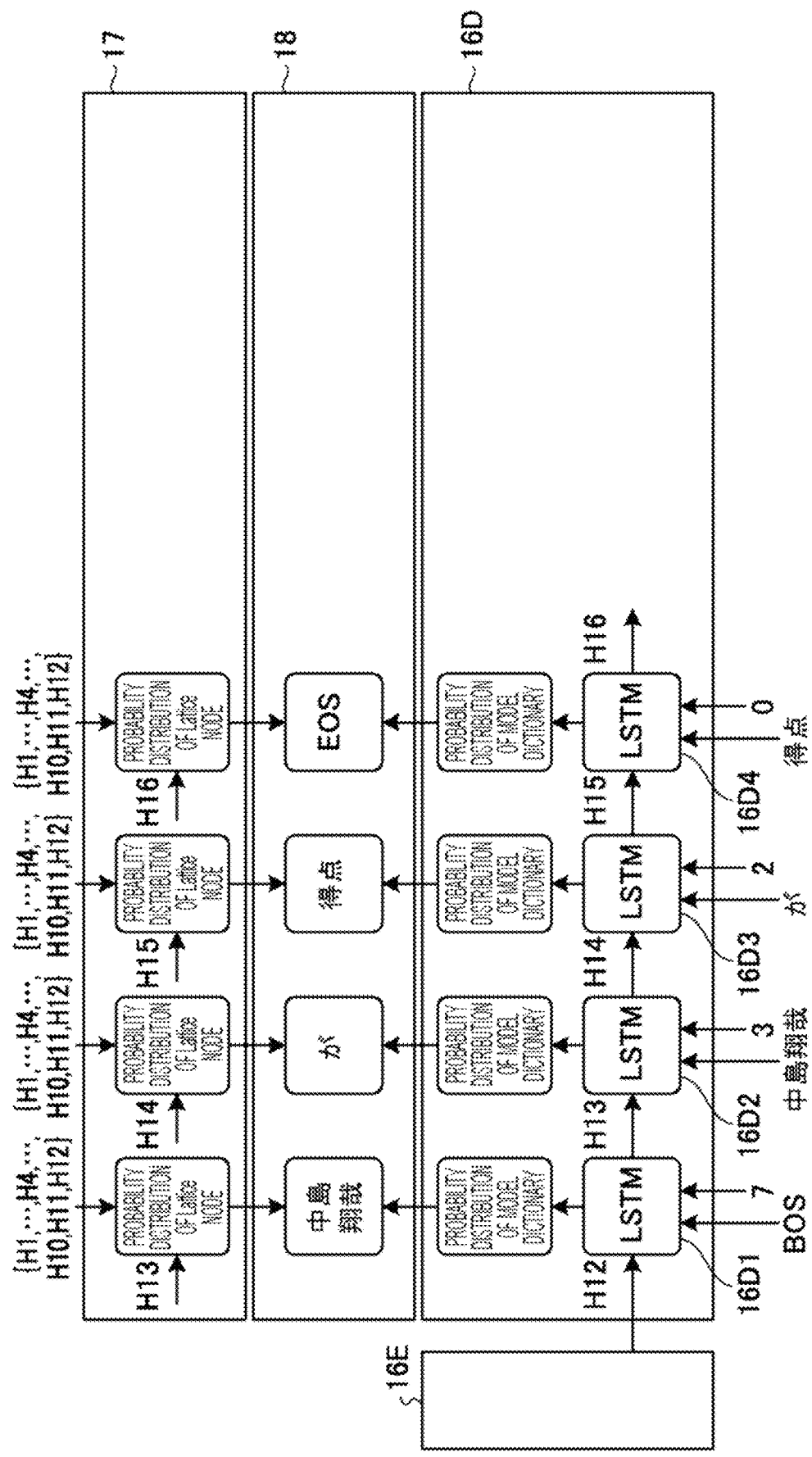
FIG. 23 is a diagram illustrating a case where a summary is generated according to Application Example 2.

FIGS. 19A and 19B exemplarily illustrate an example of a learning sample to be input to the model. FIG. 19A is a diagram illustrating an example of learning input text. FIG. 19B is a diagram illustrating an example of a correct answer summary. FIG. 20 is a diagram illustrating an example of an initial lattice. FIG. 21 is a diagram illustrating a case where a summary is generated according to a technology in the past. FIG. 22 is a diagram illustrating an example of an extended lattice. FIG. 23 is a diagram illustrating a case where a summary is generated according to Application Example 2.

In a case where learning input text 80G illustrated in FIG. 19A is input, an initial lattice 81 is generated in which nodes corresponding to the words in the learning input text 80G are serially coupled, as illustrated in FIG. 20.

(1.1) Technology in the Past

In a case where model learning is performed according to a technology in the past, LSTM cells in the RNN encoder are generated based on the initial lattice 81. With reference to the example illustrated in FIG. 20, nine cells of LSTMs 16E1 to 16E9 in the RNN encoder corresponding to the number M (=9) of nodes from the first node "<s>" to the end node "</s>" sequentially in the initial lattice 81 are expanded on a work area. The hidden state is updated and is propagated from LSTM 16E1 to 16E9, and the hidden state h9 is acquired from the RNN encoder.

On the other hand, as illustrated in FIG. 21, four LSTM cells in the RNN decoder are expanded on the work area which corresponds to the number N(=4) of words included in a correct answer summary 80Y illustrated in FIG. 19B. Hereinafter, LSTM cells expanded on the work area, which correspond to words in order from the first word in the correct answer summary 80Y, are identified as "LSTM 16D1 to LSTM 16D4".

For example, at the first time t1 when the first element of the summary is generated, the hidden state h9 output from the RNN encoder, the BOS tag, and the number of remaining characters of the summary such as the number "7" of characters of the correct answer summary 40Y are input to the first LSTM 16D1 cell of the RNN decoder. As a result, the LSTM 16D1 cell in the RNN decoder calculates the generation probability of each word in the model dictionary to calculate the generation probability $p_{vocabulary}$ of each word at the first time t1 and updates the hidden state h9 to the hidden state h10.

By using the hidden state h10 output by the LSTM 16D1 cell of the RNN decoder, the calculating unit 17 calculates generation probability of a set of 9 nodes included in the extended lattice. For example, the generation probability for the node "中島" in the initial lattice 81 is calculated. In this case, the similarity is calculated as a score between hidden state h2 output by the LSTM 16E2 cell of the RNN encoder corresponding to the node "中島" of the initial lattice 81 and the hidden state h10 updated by the LSTM 16D1 cell in the RNN decoder. In this manner, scores for all nodes included in the initial lattice 81 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element " 中島 " having the highest generation probability p at the first time t1. By subtracting the number "2" of characters for the word " 中島 " generated at the first time t1 from the initial value "7" of the number of remaining characters, the value of the number of remaining characters is updated to "5".

Next, at the second time t2 when the first element of the summary is to be generated, the hidden state h10 output from the LSTM 16D1 at one previous time of the RNN decoder, the word " 中島翔哉 " of the correct answer at one previous time and the number "5" of remaining characters of the summary are input to the second LSTM 16D2 cell from the beginning of the RNN decoder. As a result, the LSTM 16D2 cell in the RNN decoder calculates the generation probability of each word in the model dictionary to calculate the generation probability $p_{vocabulary}$ of each word at the second time t2 and updates the hidden state h10 to the hidden state h11.

By using the hidden state h11 output by the LSTM 16D2 cell of the RNN decoder, the calculating unit 17 calculates generation probability of a set of 9 nodes included in the extended lattice. For example, the generation probability for the node " 中島 " in the initial lattice 81 is calculated. In this case, the similarity is calculated as a score between the hidden state h2 output by the LSTM 16E2 cell of the RNN encoder corresponding to the node " 中島 " of the initial lattice 81 and the hidden state h11 updated by the LSTM 16D2 cell in the RNN decoder. In this manner, scores for all nodes included in the initial lattice 81 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element " が " having the highest generation probability p at the second time t2. By subtracting the number "1" of characters for the word " が " generated at the second time t2 from the number "5" of remaining characters, the value of the number of remaining characters is updated to "4".

This processing is repeatedly executed up to the fourth time t4 where the sentence end symbol "EOS" is output from the LSTM 16D4. As a result, according to the technology in the past, the summary " 中島が得点 " is acquired. Apparently from the comparison between the result and the correct answer summary 80Y, the summary includes the phrase " 中島 " disconnected though the phrase " 中島翔哉 " is supposed to be output without disconnection. According to the technology in the past, it is apparent that the suppression of generation of a summary by disconnecting a part " 翔哉 " of the named entity included in input text is failed.

(1.2) Application Example 2

On the other hand, in a case where model learning is performed according to Application Example 2, the initial lattice 81 is not used for the generation of LSTM cells in the RNN encoder, unlike the technology in the past. In other words, a series of named entities " 中島翔哉 " is extracted from the learning input text 80G. Thus, the initial lattice 81 illustrated in FIG. 20 is extended to the extended lattice 83 illustrated in FIG. 22. In other words, for example, as highlighted in FIG. 22, a node corresponding to the series of named entities " 中島翔哉 " is added to the section corresponding to the named entities " 中島翔哉 " in the learning input text 80G.

This extended lattice 83 is used for generation of LSTM cells in the RNN encoder. With reference to the example illustrated in FIG. 22, 12 cells of LSTMs 16E1 to 16E12 in the RNN encoder corresponding to the number M (=12) of nodes from the first node "<s>" to the end node "</s>" sequentially in the extended lattice 83 are expanded on a work area. The hidden state is updated and is propagated from LSTM 16E1 to 16E12, and the hidden state h12 is acquired from the RNN encoder.

On the other hand, as illustrated in FIG. 23, four LSTM cells in the RNN decoder are expanded on the work area which corresponds to the number N(=4) of words included in a correct answer summary 80Y illustrated in FIG. 19B. Hereinafter, LSTM cells expanded on the work area, which correspond to words in order from the first word in the correct answer summary 80Y, are identified as "LSTM 16D1 to LSTM 16D4".

For example, at the first time t1 when the first element of the summary is generated, the hidden state H12 output from the RNN encoder, the BOS tag, and the number of remaining characters of the summary such as the number "7" of characters of the correct answer summary 80Y are input to the first LSTM 16D1 cell of the RNN decoder. As a result, the LSTM 16D1 cell in the RNN decoder calculates the generation probability of each word in the model dictionary to calculate the generation probability $p_{vocabulary}$ of each word at the first time t1 and updates the hidden state H12 to the hidden state H13.

By using the hidden state H13 output by the LSTM 16D1 cell of the RNN decoder, the calculating unit 17 calculates generation probability of a set of twelve nodes included in the extended lattice. For example, the generation probability for the node " 中島翔哉 " in the extended lattice 83 is calculated. In this case, the similarity is calculated as a score between the hidden state H4 output by the LSTM 16E4 cell of the RNN encoder corresponding to the node " 中島翔哉 " of the extended lattice 83 and the hidden state H13 updated by the LSTM 16D1 cell in the RNN decoder. In this manner, scores for all nodes included in the extended lattice 83 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice, the generating unit 18 outputs the element " 中島翔哉 " having the highest generation probability p at the first time t1. By subtracting the number "4" of characters for the word " 中島翔哉 " generated at the first time t1 from the initial value "7" of the number of remaining characters, the value of the number of remaining characters is updated to "3".

This processing is repeatedly executed up to the fourth time t4 where the sentence end symbol "EOS" is output from the LSTM 16D4. As a result, according to Application Example 2, the summary " 中島翔哉が得点 " is acquired. Apparently from the comparison between this result and the correct answer summary 80Y, the series of named entities "中島翔哉" is output as it is without disconnection according to Application Example 2. According to Application Example 2, it is apparent that generation of a summary by disconnecting a part "翔哉" of the named entity included in input text may be suppressed.

(2) Specific Example of Summary Generation

Figure 24:
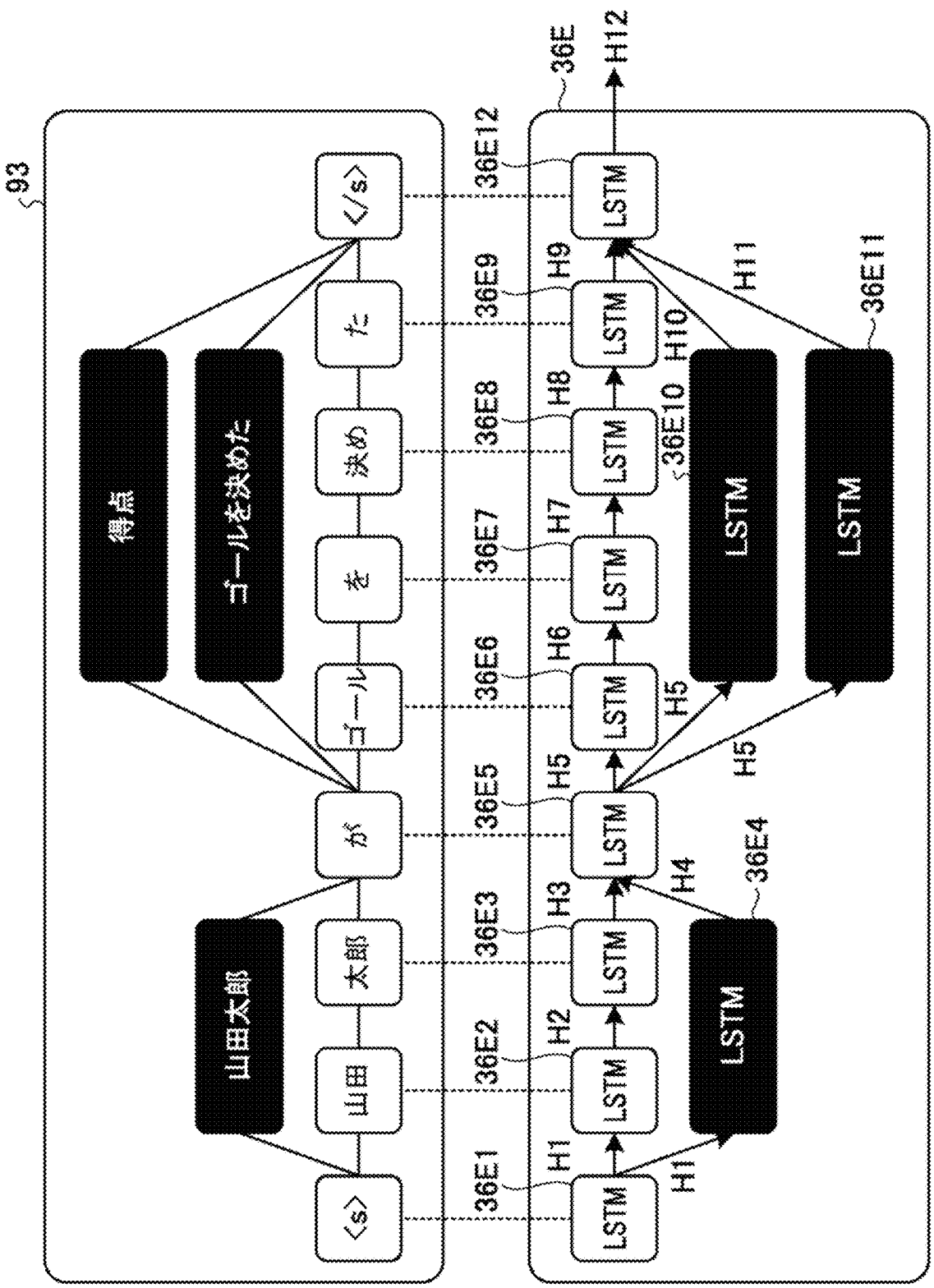
FIG. 24 is a diagram illustrating an example of an extended lattice.
Figure 25:
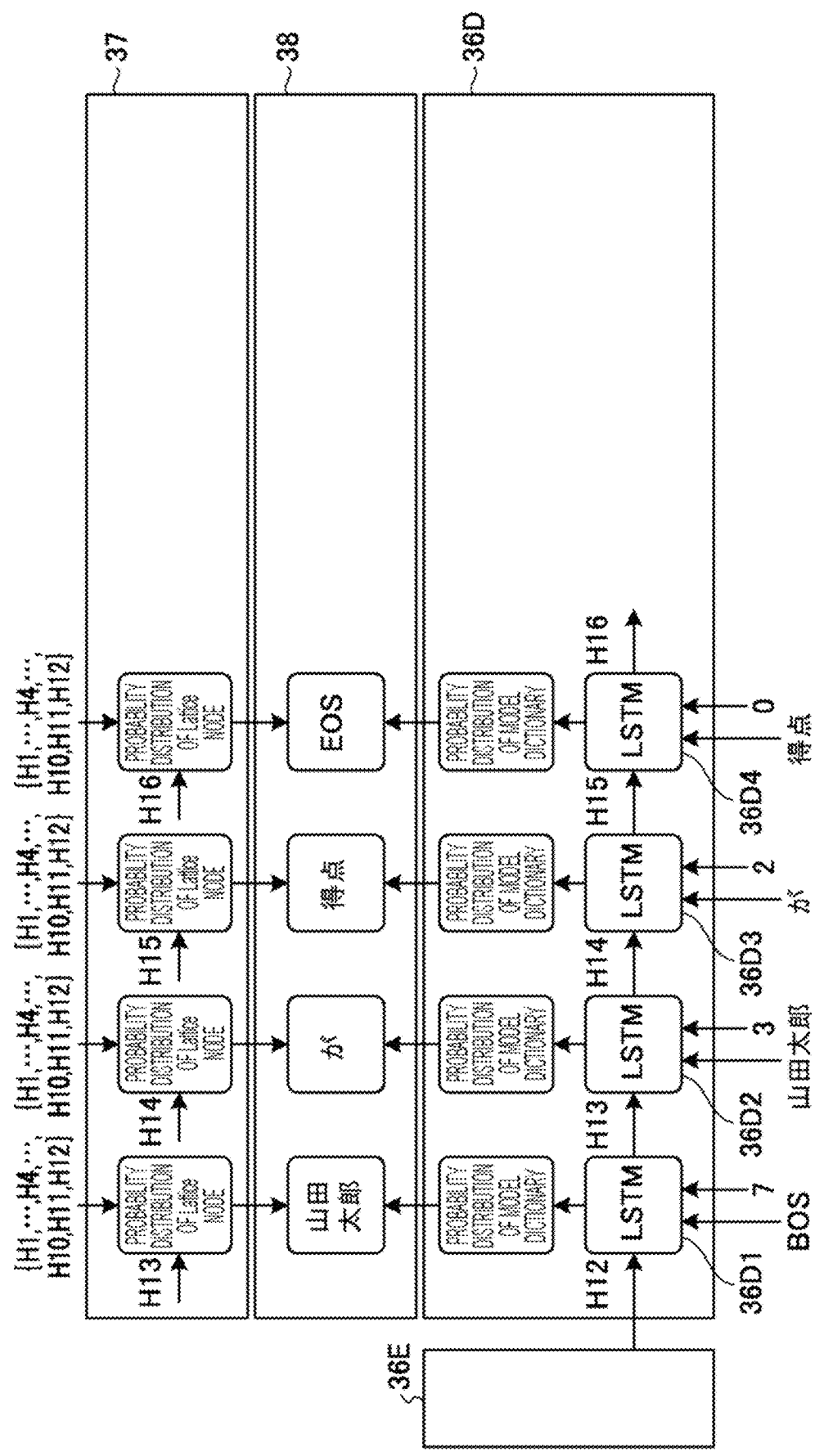
FIG. 25 is a diagram illustrating a case where a summary is generated according to Application Example 2.

With reference to FIGS. 24 and 25, specific examples of summary generation will be described below. An example in which input text "山田太郎がゴールを決めた" similar to the learning input text 80G illustrated in FIG. 19A is input will be described.

FIG. 24 is a diagram illustrating an example of an extended lattice. FIG. 25 is a diagram illustrating a case where a summary is generated according to Application Example 2.

In a case where input text "山田太郎がゴールを決めた" is input, an initial lattice is generated constructed by serially coupling nodes corresponding to the words of the input text "山田太郎がゴールを決めた".

In a case where a summary is generated according to Application Example 2, the initial lattice is not used for the generation of LSTM cells in the RNN encoder, unlike the technology in the past. In other words, a series of named entities "山田太郎" is extracted from the input text. Thus, the initial lattice generated from the input text is extended to an extended lattice 93 illustrated in FIG. 24. In other words, for example, as highlighted in FIG. 24, a node corresponding to the series of named entities "山田太郎" is added to the section corresponding to the named entities "山田太郎" in the input text.

This extended lattice 93 is used for generation of LSTM cells in the RNN encoder. With reference to the example illustrated in FIG. 24, twelve cells of LSTMs 36E1 to 36E12 in the RNN encoder corresponding to the number K (=12) of nodes from the first node "<s>" to the end node "</s>" sequentially in the extended lattice 93 are expanded on a work area. The hidden state is updated and is propagated from LSTM 36E1 to 36E12, and the hidden state H12 is acquired from the RNN encoder.

On the other hand, as illustrated in FIG. 25, as LSTM cells in the RNN decoder, four LSTM cells corresponding to the number L (=4) of elements of the summary up to output of the EOS tag are expanded on a work area. Hereinafter, the LSTM cells expanded on the work area and corresponding to the elements sequentially from the first element of the summary are identified as "LSTM 36D1 to LSTM 36D4".

For example, at the first time t1 when the first element of the summary is generated, the hidden state H12 output from the RNN encoder, the BOS tag, and the number "7" of remaining characters of the summary are input to the first LSTM 36D1 cell of the RNN decoder. As a result, the LSTM 36D1 cell in the RNN decoder calculates the generation probability of each word in the model dictionary to calculate the generation probability $p_{vocabulary}$ of each word at the first time t1 and updates the hidden state H12 to the hidden state H13.

By using the hidden state H13 output by the LSTM 36D1 cell of the RNN decoder, the calculating unit 17 calculates generation probability of a set of twelve nodes included in the extended lattice. For example, the generation probability for the node "山田太郎" in the extended lattice 93 is calculated. In this case, the similarity is calculated as a score between the hidden state H4 output by the LSTM 36E4 cell of the RNN encoder corresponding to the node "山田太郎" of the extended lattice 93 and the hidden state H13 updated by the LSTM 36D1 cell in the RNN decoder. In this manner, scores for all nodes included in the extended lattice 93 are calculated. Then, the scores of the nodes are normalized such that a total of the scores of all nodes is equal to "1". Thus, the generation probability $p_{attention}$ of each of the nodes is acquired.

After that, based on generation probability p of each element acquired by linear combination of the generation probability $p_{vocabulary}$ of each word in the model dictionary and the generation probability $p_{attention}$ of each node of the extended lattice 93, the generating unit 38 outputs the element "山田太郎" having the highest generation probability p at the first time t1. By subtracting the number "4" of characters for the word "山田太郎" generated at the first time t1 from the initial value "7" of the number of remaining characters, the value of the number of remaining characters is updated to "3".

This processing is repeatedly executed up to the fourth time t4 where the sentence end symbol "EOS" is output from the LSTM 36D4. As a result, according to Application Example 2, the summary "山田太郎が得点" is acquired. Apparently from this result, the series of named entities "山田太郎" is output as it is without disconnection according to Application Example 2. According to Application Example 2, it is apparent that generation of a summary by disconnecting a part "太郎" of the named entity included in input text may be suppressed.

Abbreviation Expression

Having described that, according to Embodiment 1, an entry including a phrase of a named entity and its abbreviation expression in association as an example of an entry in the abbreviation expression dictionary, the phrase to be registered with the abbreviation expression dictionary may not be a named entity. For example, an entry including a phrase other than a named entity and its abbreviation expression in association may be included in the abbreviation expression dictionary. As an example, in a case where an entry including a phrase "ゴールを決めた" and its abbreviation expression "得点" in association exists in the abbreviation expression dictionary, the node corresponding to the abbreviation expression "得点" may be added to the section of the phrase "ゴールを決めた" in the learning input text or input text like the extended lattice 83 illustrated in FIG. 22 or the extended lattice 93 illustrated in FIG. 24. Thus, the phrase "ゴールを決めた" may be abbreviated to the abbreviation expression "得点" to generate the summary.

Distribution and Integration

The components illustrated in the drawings do not necessarily have to be physically configured as illustrated in the drawings. Specific forms of the separation and integration of the devices are not limited to the illustrated forms, and all or a portion thereof may be separated and integrated in any units in either a functional or physical manner depending on various loads, usage states, and the like. For example, the obtaining unit 13, the lattice extension unit 14, the encoder executing unit 16E, the decoder executing unit 16D, the calculating unit 17, the generating unit 18 or the updating unit 19 may be coupled with the learning apparatus 10 over a network as external devices. The obtaining unit 13, the lattice extension unit 14, the encoder executing unit 16E, the decoder executing unit 16D, the calculating unit 17, the generating unit 18 or the updating unit 19 may be provided in separate apparatuses and may be coupled over a network for cooperation to implement the functions of the learning apparatus 10. For example, the obtaining unit 33, the lattice extension unit 34, the encoder executing unit 36E, the decoder executing unit 36D, the calculating unit 37 or the generating unit 38 may be coupled with the generating apparatus 30 over a network as external devices. The obtaining unit 33, the lattice extension unit 34, the encoder executing unit 36E, the decoder executing unit 36D, the calculating unit 37, or the generating unit 38 may be provided in separate apparatuses and may be coupled over a network for cooperation to implement the functions of the generating apparatus 30.

Summary Generation Program

The various kinds of processing described in the above embodiments may be implemented by executing a program prepared in advance on a computer such as a personal computer or a workstation. In the following, with reference to FIG. 26, a description is given of an example of a computer for executing a summary generation program having the same functions as those of the above-described embodiments.

Figure 26:
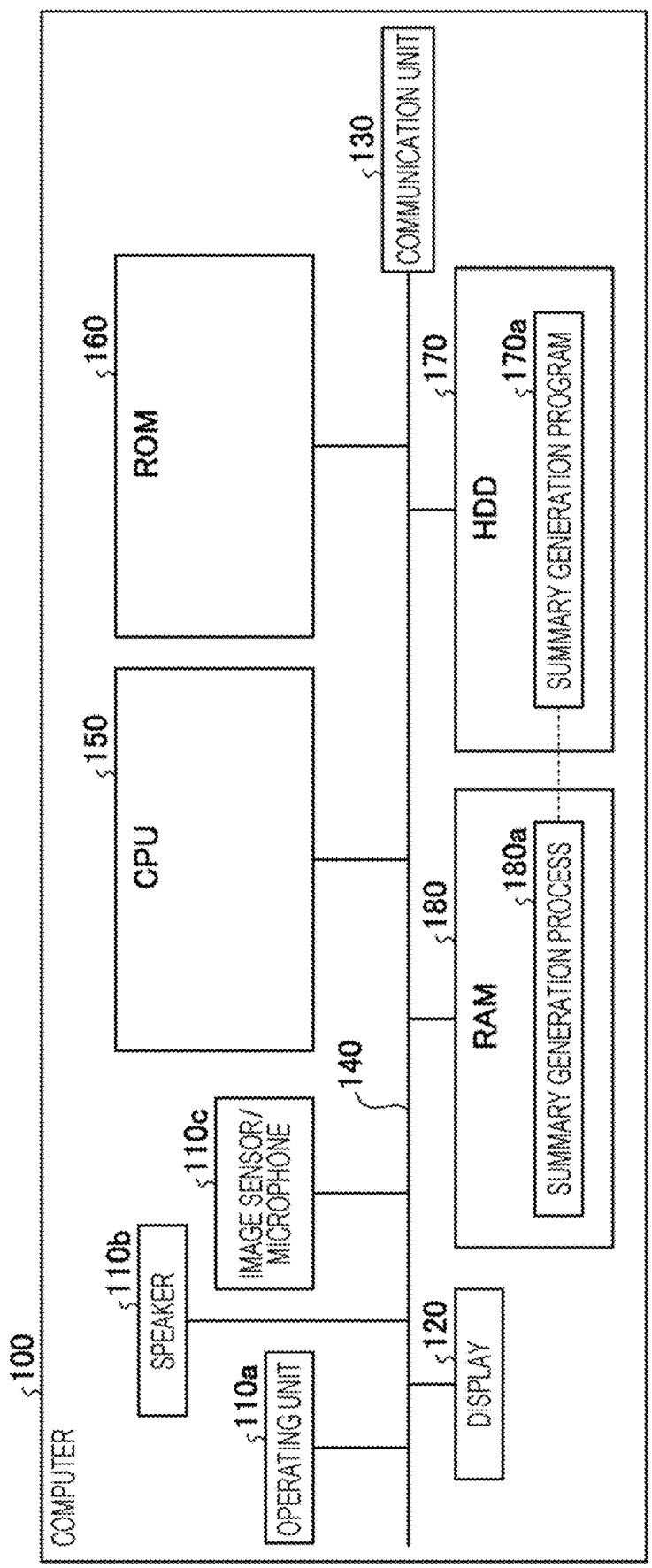
FIG. 26 is a diagram illustrating an exemplary hardware configuration of a computer configured to execute a summary generation program according to Embodiments 1 and 2.

FIG. 26 is a diagram illustrating an exemplary hardware configuration of a computer configured to execute a summary generation program according to Embodiments 1 and 2. As illustrated in FIG. 26, a computer 100 includes an operation unit 110a, a speaker 110b, a microphone and/or image sensor 110c, a display 120, and a communication unit 130. The computer 100 includes a CPU 150, a read-only memory (ROM) 160, an HDD 170, and a RAM 180. These units 110 to 180 are coupled to each other via a bus 140.

The HDD 170 stores a summary generation program 170a that implement an equivalent function to the obtaining unit 13, the lattice extension unit 14, the encoder executing unit 16E, the decoder executing unit 16D, the calculating unit 17, the generating unit 18 or the updating unit 19 according to Embodiment 1, as illustrated in FIG. 26. The HDD 170 may store a summary generation program 170a that implements an equivalent function to the obtaining unit 33, the lattice extension unit 34, the encoder executing unit 36E, the decoder executing unit 36D, the calculating unit 37 or the generating unit 38. The summary generation program 170a may be integrated or be separated like the components of the functional units illustrated in FIG. 1. In other words, for example, the HDD 170 may not store all data described according to Embodiment 1, but data to be used for processing may be stored in the HDD 170.

Under such an environment, the CPU 150 loads the summary generation program 170a from the HDD 170 into the RAM 180. As a result, the summary generation program 170a functions as a summary generation process 180a as illustrated in FIG. 26. The summary generation process 180a unarchives various kinds of data read from the HDD 170 in an area allocated to the summary generation process 180a in the storage area included in the RAM 180, and executes various kinds of processing using these various kinds of data thus unarchived. For example, the processing performed by the summary generation process 180a includes the processing illustrated in FIGS. 10 to 13 and FIG. 18. Not all the processing units described in Embodiment 1 necessarily have to operate on the CPU 150, but only a processing unit(s) required for the processing to be executed may be virtually implemented.

The summary generation program 170a does not necessarily have to be initially stored in the HDD 170 or the ROM 160. For example, the summary generation program 170a is stored in a "portable physical medium" such as a flexible disk called an FD, a CD-ROM, a DVD disk, a magneto-optical disk, or an IC card, which will be inserted into the computer 100. The computer 100 may acquire the learning program 170a from the portable physical medium, and execute the summary generation program 170a. The summary generation program 170a may be stored in another computer or server apparatus coupled to the computer 100 via a public line, the Internet, a LAN, a WAN, or the like, and the computer 100 may acquire the learning program 170a from the other computer, and execute the summary generation program 170a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented summary generation method comprising:
    obtaining input text;
    generating an initial lattice including a plurality of serially coupled nodes corresponding to words within the input text;
    generating a node of a section corresponding to a predetermined expression within the initial lattice;
    adding the generated node to the initial lattice to provide an extended lattice corresponding to the input text;
    calculating a generation probability of each word within the input text using a dictionary and a machine learning model;
    calculating a generation probability for each node included in the extended lattice based on a hidden state output by a cell corresponding to the node among cells in an encoder of the machine learning model and a hidden state updated by a cell in a decoder of the machine learning model; and
    generating an element of a summary of the input text based on the generation probability of each word and the generation probability of each node of the extended lattice,
    wherein, when there is a named entity within the input text, the generating generates a node corresponding to the named entity, and the adding adds the node corresponding to the named entity to the initial lattice to extend the initial lattice into the extended lattice.

2. The summary generation method according to claim 1, wherein, when there is an abbreviation expression corresponding to a word N-gram within the input text, the generating generates a node corresponding to the abbreviation expression corresponding to the word N-gram, and the adding adds the node corresponding to the abbreviation expression to the initial lattice to extend the initial lattice into the extended lattice.

3. The summary generation method according to claim 1, wherein, when there is an abbreviation expression corresponding to a word N-gram within the input text, the generating generates a node corresponding to characters included in the word N-gram, and the adding adds the node corresponding to the characters to the initial lattice to extend the initial lattice into the extended lattice.

4. The summary generation method according to claim 1, wherein, when there is an abbreviation expression corresponding to a named entity extracted from a word string within the input text, the generating generates a node corresponding to the abbreviation expression corresponding to the named entity, and the adding adds the node corresponding to the named entity to the initial lattice to extend the initial lattice into the extended lattice.

5. The summary generation method according to claim 1, wherein, when there is an abbreviation expression corresponding to a named entity extracted from a word string within the input text, the generating generates a node corresponding to characters included in the named entity, and the adding adds the node corresponding to the characters to the initial lattice to extend the initial lattice into the extended lattice.

6. The summary generation method according to claim 1, wherein the machine learning model is incorporated into an article summary program that generates the summary of an article when the article is input as the input text.

7. A non-transitory computer-readable recording medium having stored therein a program that, when executed by a processor, causes the processor to be configured to:
obtain input text;
generate an initial lattice including a plurality of serially coupled nodes corresponding to words within the input text;
generate a node of a section corresponding to a predetermined expression within the initial lattice;
add the generated node to the initial lattice to provide an extended lattice corresponding to the input text;
calculate a generation probability of each word within the input test using a dictionary and a machine learning model;
calculate a generation probability for each node included in the extended lattice based on a hidden state output by a cell corresponding to the node among cells in an encoder of the machine learning model and a hidden state updated by a cell in a decoder of the machine learning model; and
generate an element of a summary of the input text based on the generation probability of each word and the generation probability of each node of the extended lattice,
wherein, when there is a named entity within the input text, the processor generates a node corresponding to the named entity, and adds the node corresponding to the named entity to the initial lattice to extend the initial lattice into the extended lattice.

8. The non-transitory computer-readable recording medium according to claim 7, wherein, when there is an abbreviation expression corresponding to a word N-gram within the input text, the processor generates a node corresponding to the abbreviation expression, and adds the node corresponding to the word N-gram to the initial lattice to extend the initial lattice into the extended lattice.

9. The non-transitory computer-readable recording medium according to claim 7, wherein, when there is an abbreviation expression corresponding to a word N-gram within the input text, the processor generates a node corresponding to characters included in the word N-gram, and adds the node corresponding to the characters to the initial lattice to extend the initial lattice into the extended lattice.

10. The non-transitory computer-readable recording medium according to claim 7, wherein, when there is an abbreviation expression corresponding to a named entity extracted from a word string within the input text, the processor generates a node corresponding to the abbreviation expression, and adds the node corresponding to the named entity to the initial lattice to extend the initial lattice into the extended lattice.

11. The non-transitory computer-readable recording medium according to claim 7, wherein, when there is an abbreviation expression corresponding to a named entity extracted from a word string within the input text, the processor generates a node corresponding to characters included in the named entity, and adds the node corresponding to the characters to the initial lattice to extend the initial lattice into the extended lattice.

12. The non-transitory computer-readable recording medium according to claim 7, wherein the machine learning model is incorporated into an article summary program that generates the summary of an article when the article is input as the input text.

13. A summary generation apparatus comprising:
a memory; and
a processor coupled to the memory and the processor configured to:
obtain input text;
generate an initial lattice including a plurality of serially coupled nodes corresponding to words within the input text;
generate a node of a section corresponding to a predetermined expression within the initial lattice;
add the generated node to the initial lattice to provide an extended lattice corresponding to the input text;
calculate a generation probability of each word within the input test using a dictionary and a machine learning model;
calculate a generation probability for each node included in the extended lattice based on a hidden state output by a cell corresponding to the node among cells in an encoder of the machine learning model and a hidden state updated by a cell in a decoder of the machine learning model; and
generate an element of a summary of the input text based on the generation probability of each word and the generation probability of each node of the extended lattice,
wherein, when there is a named entity within the input text, the processor generates a node corresponding to the named entity, and adds the node corresponding to the named entity to the initial lattice to extend the initial lattice into the extended lattice.

14. The summary generation apparatus according to claim 13, wherein, when there is an abbreviation expression corresponding to a word N-gram within the input text, the processor generates a node corresponding to the abbreviation expression, and adds the node corresponding to the word N-gram to the initial lattice to extend the initial lattice into the extended lattice.

15. The summary generation apparatus according to claim 13, wherein, when there is an abbreviation expression corresponding to a word N-gram within the input text, the processor generates a node corresponding to characters included in the word N-gram, and adds the node corresponding to the characters to the initial lattice to extend the initial lattice into the extended lattice.

16. The summary generation apparatus according to claim 13, wherein, when there is an abbreviation expression corresponding to a named entity extracted from a word string within the input text, the processor generates a node corresponding to the abbreviation expression, and adds the node corresponding to the named entity to the initial lattice to extend the initial lattice into the extended lattice.

17. The summary generation apparatus according to claim 13, wherein the machine learning model is incorporated into an article summary program that generates the summary of an article when the article is input as the input text.

* * * * *